(12) United States Patent
Petit et al.

(10) Patent No.: US 12,408,039 B2
(45) Date of Patent: Sep. 2, 2025

(54) REPUTATION SCORE ASSIGNMENT FOR VEHICLE-BASED COMMUNICATIONS

(71) Applicant: QUALCOMM Incorporated, San Diego, CA (US)

(72) Inventors: Jonathan Petit, Wenham, MA (US); Soumya Das, San Diego, CA (US); Mohammad Nekoui, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 17/697,723

(22) Filed: Mar. 17, 2022

(65) Prior Publication Data

US 2023/0300616 A1    Sep. 21, 2023

(51) Int. Cl.
*H04W 12/108* (2021.01)
*H04W 4/40* (2018.01)
*H04W 12/106* (2021.01)

(52) U.S. Cl.
CPC ......... *H04W 12/108* (2021.01); *H04W 4/40* (2018.02); *H04W 12/106* (2021.01)

(58) Field of Classification Search
None
See application file for complete search history.

(56) References Cited

U.S. PATENT DOCUMENTS

| | | | | |
|---|---|---|---|---|
| 10,166,991 B1* | 1/2019 | Bai | | G08G 1/0112 |
| 2012/0233665 A1* | 9/2012 | Ranganathan | | G06F 21/51 |
| | | | | 726/4 |
| 2016/0280370 A1* | 9/2016 | Canavor | | H04W 12/062 |
| 2017/0287233 A1* | 10/2017 | Nix | | G08G 1/166 |
| 2018/0322785 A1* | 11/2018 | Jerichow | | G08G 1/096791 |
| 2019/0261171 A1* | 8/2019 | Cozzetti | | H04W 12/108 |
| 2020/0139980 A1* | 5/2020 | Liu | | B60W 30/12 |
| 2020/0269875 A1* | 8/2020 | Wray | | G01C 21/3691 |

(Continued)

FOREIGN PATENT DOCUMENTS

| | | | | | |
|---|---|---|---|---|---|
| CN | 113965398 A | * | 1/2022 | | H04L 67/10 |
| CN | 114124990 A | * | 3/2022 | | H04L 67/06 |
| EP | 3829200 A2 | | 6/2021 | | |

OTHER PUBLICATIONS

International Search Report and Written Opinion—PCT/US2023/013432—ISA/EPO—May 12, 2023.

(Continued)

*Primary Examiner* — Michael Pyzocha
(74) *Attorney, Agent, or Firm* — QUALCOMM Incorporated

(57) ABSTRACT

Systems and techniques are described for assigning a reputation score for vehicle-to-everything (V2X) communications. For example, a process may include receiving, at a receiving device (e.g., a vehicle, network entity, etc.), vehicle-based messages from a transmitting device (e.g., a vehicle, network-equipped infrastructure, etc.). Each of the vehicle-based messages includes information associated with the transmitting device. The process may include determining, at the receiving device, a reputation score for the transmitting device based on at least a portion of the information associated with the transmitting device from each vehicle-based message of the plurality of vehicle-based messages.

30 Claims, 18 Drawing Sheets

(56) References Cited

U.S. PATENT DOCUMENTS

| | | |
|---|---|---|
| 2021/0112417 A1 | 4/2021 | Geissler et al. |
| 2022/0126864 A1* | 4/2022 | Moustafa .............. B60W 50/14 |
| 2022/0279352 A1* | 9/2022 | Zhao ....................... H04W 4/40 |
| 2023/0206751 A1* | 6/2023 | Bieger ................. G08G 1/0125 |
| | | 701/117 |
| 2023/0286520 A1* | 9/2023 | Qi ....................... H04W 12/106 |

OTHER PUBLICATIONS

Liu X., et al., "MISO-V: Misbehavior Detection for Collective Perception Services in Vehicular Communications", IEEE Intelligent Vehicles Symposium (IV), Nagoya, Japan, Jul. 11, 2021, XP034005588, pp. 369-376, Section III.D.

Slama A., et al., "TCSR: an AIMD Trust-based Protocol for Secure Routing in VANET", 2018 International Conference on Smart Communications and Networking (SmartNets), IEEE, Nov. 16, 2018, XP033546361, 8 pages, p. 3, paragraph C-p. 8, paragraph V.

* cited by examiner

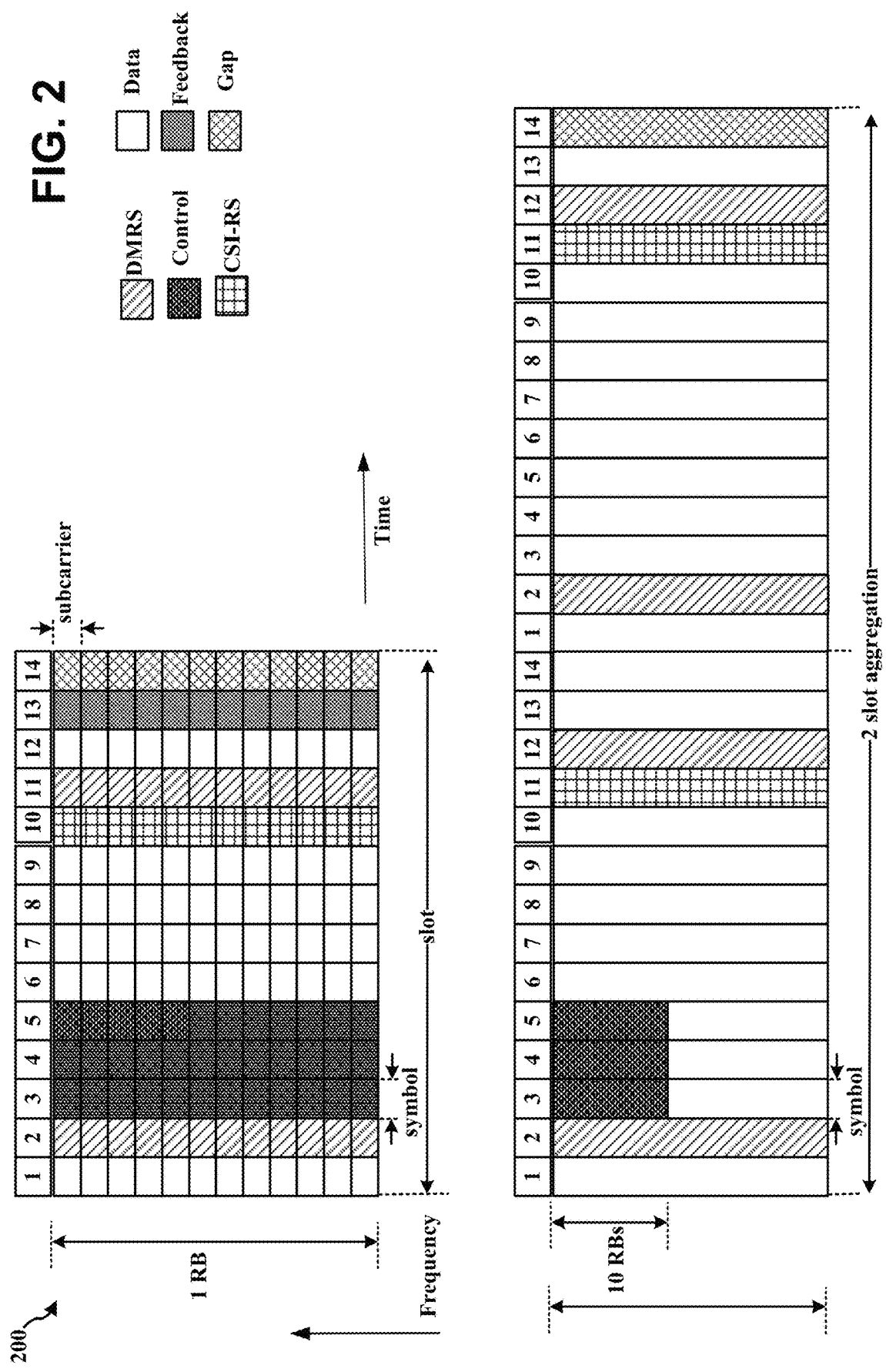

REPUTATION SCORE ASSIGNMENT FOR VEHICLE-BASED COMMUNICATIONS

FIELD

The present disclosure relates generally to communication systems. For example, aspects of the present disclosure relate to a configuration for assigning a reputation score for vehicle-based communications, such as vehicle-to-everything (V2X) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X, vehicle-to-vehicle (V2V), and/or device-to-device (D2D) communication. There exists a need for further improvements in V2X, V2V, and/or D2D technology. These improvements may also be applicable to other multi-access technologies and the telecommunication standards that employ these technologies.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for assigning a reputation score for vehicle-based communications (e.g., V2X communications). According to at least one example, a method is provided for wireless communications at a receiving device. The method includes: receiving, at the receiving device, a plurality of vehicle-based messages from a transmitting device, wherein each vehicle-based message of the plurality of vehicle-based messages comprises information associated with the transmitting device; and determining, at the receiving device, a reputation score for the transmitting device based on at least a portion of the information associated with the transmitting device from each vehicle-based message of the plurality of vehicle-based messages.

In another example, an apparatus for wireless communications is provided that includes at least one memory (e.g., configured to store data, such as virtual content data, one or more images, etc.) and at least one processor (e.g., implemented in circuitry) coupled to the at least one memory. The at least one processor is configured to and can: receive a plurality of vehicle-based messages from a transmitting device, wherein each vehicle-based message of the plurality of vehicle-based messages comprises information associated with the transmitting device; and determine a reputation score for the transmitting device based on at least a portion of the information associated with the transmitting device from each vehicle-based message of the plurality of vehicle-based messages.

In another example, a non-transitory computer-readable medium of a receiving device is provided that has stored thereon instructions that, when executed by one or more processors, cause the one or more processors to: receive a plurality of vehicle-based messages from a transmitting device, wherein each vehicle-based message of the plurality of vehicle-based messages comprises information associated with the transmitting device; and determine a reputation score for the transmitting device based on at least a portion of the information associated with the transmitting device from each vehicle-based message of the plurality of vehicle-based messages.

In another example, an apparatus for wireless communications is provided. The apparatus includes: means for receiving a plurality of vehicle-based messages from a transmitting device, wherein each vehicle-based message of the plurality of vehicle-based messages comprises information associated with the transmitting device; and means for determining a reputation score for the transmitting device based on at least a portion of the information associated with the transmitting device from each vehicle-based message of the plurality of vehicle-based messages.

In some aspects, the apparatus is, or is part of, a vehicle (e.g., an automobile, truck, etc., or a component or system of an automobile, truck, etc.), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 2 illustrate example aspects of a sidelink slot structure, in accordance with some aspects of the present disclosure.

DETAILED DESCRIPTION

Figure 1:
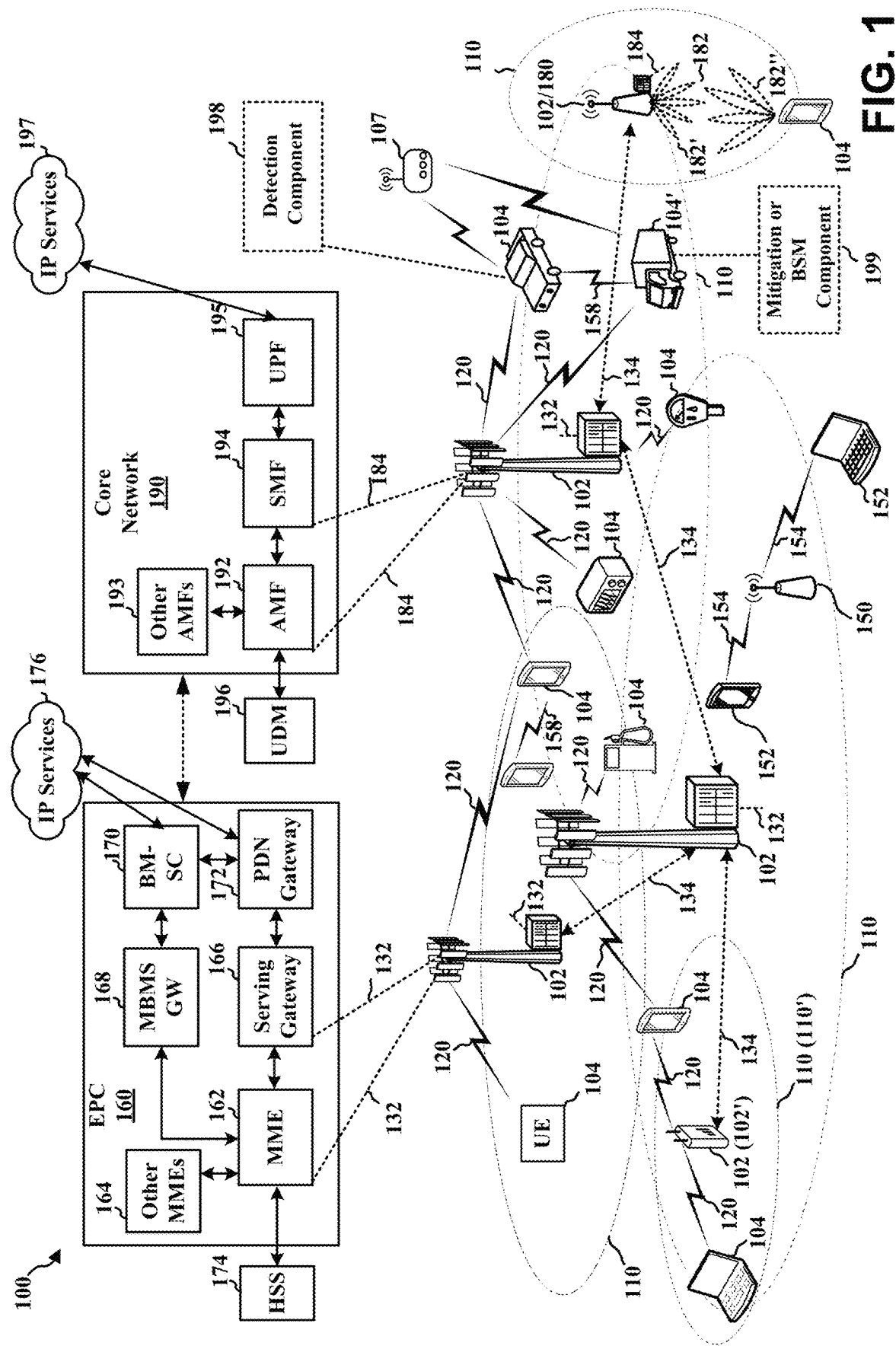
FIG. 1 is a diagram illustrating an example of a wireless communications system and an access network, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communications systems are deployed to provide various telecommunication services, including telephony, video, data, messaging, broadcasts, among others. Wireless communications systems have developed through various generations. A 5G mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

Vehicles are an example of devices or systems that can include wireless communications capabilities. For example, vehicles (e.g., automotive vehicles, autonomous vehicles, aircraft, maritime vessels, among others) can communicate with other vehicles and/or with other devices that have wireless communications capabilities. Wireless vehicle communication systems encompass vehicle-to-vehicle (V2V), vehicle-to-infrastructure (V2I), and vehicle-to-pedestrian (V2P) communications, which are all collectively referred to as vehicle-to-everything (V2X) communications. V2X communications is a vehicular communication system that supports the wireless transfer of information from a vehicle to other entities (e.g., other vehicles, pedestrians with smart phones, and/or other traffic infrastructure) located within the traffic system that may affect the vehicle. The main purpose of the V2X technology is to improve road safety, fuel savings, and traffic efficiency.

In a V2X communication system, information is transmitted from vehicle sensors (and other sources) through wireless links to allow the information to be communicated to other vehicles, pedestrians, and/or traffic infrastructure. The information may be transmitted using one or more vehicle-based messages, such as C-V2X messages, which can include Sensor Data Sharing Messages (SDSMs), Basic Safety Messages (BSMs), Cooperative Awareness Messages (CAMs), Collective Perception Messages (CPMs), and/or other type of message. By sharing this information with other vehicles, the V2X technology improves vehicle (and driver) awareness of potential dangers to help reduce collisions with other vehicles and entities. In addition, the V2X technology enhances traffic efficiency by providing traffic warnings to vehicles of potential upcoming road dangers and obstacles such that vehicles may choose alternative traffic routes.

As previously mentioned, the V2X technology includes V2V communications, which can also be referred to as peer-to-peer communications. V2V communications allows for vehicles to directly wireless communicate with each other while on the road. With V2V communications, vehicles can gain situational awareness by receiving information regarding upcoming road dangers (e.g., unforeseen oncoming vehicles, accidents, and road conditions) from the other vehicles.

The IEEE 802.11p Standard supports uses a dedicated short-range communications (DSRC) interface for V2X wireless communications. Characteristics of the IEEE 802.11p based DSRC interface include low latency and the use of the unlicensed 5.9 Gigahertz (GHz) frequency band. Cellular V2X (C-V2X) was adopted as an alternative to using the IEEE 802.11p based DSRC interface for the wireless communications. The 5G Automotive Association (5GAA) supports the use of C-V2X technology. In some cases, the C-V2X technology uses Long-Term Evolution (LTE) as the underlying technology, and the C-V2X functionalities are based on the LTE technology. C-V2X includes a plurality of operational modes. One of the operational modes allows for direct wireless communication between vehicles over the LTE sidelink PC5 interface. Similar to the IEEE 802.11p based DSRC interface, the LTE C-V2X sidelink PC5 interface operates over the 5.9 GHz frequency band.

Vehicle-based messages are beneficial because they can provide an awareness and understanding to vehicles of upcoming potential road dangers (e.g., unforeseen oncoming vehicles, accidents, and road conditions). Receiving devices (e.g., vehicles receiving vehicle-based messages) can benefit from having a reputation score assigned to transmitting devices (e.g., transmitting vehicles) of the vehicle-based messages (referred to as transmitting devices) to weigh the accuracy (e.g., relating to the accuracy of the sensors) and/or validity (e.g., relating to whether the transmitting device is misbehaving by reporting incorrect information) of the information contained within the vehicle-based messages.

In some cases, a transmitting device can assign a reputation score to itself, and advertise its reputation score along in a vehicle-based message. However, when transmitting devices are able to assign a reputation score for themselves, some transmitting devices may cheat by assigning false reputation scores (e.g., assigning overly inflated reputation scores for themselves).

In some aspects of the present disclosure, systems, apparatuses, methods (also referred to as processes), and computer-readable media (collectively referred to herein as "systems and techniques") are described herein for assigning reputation scores for transmitting devices (e.g., transmitting vehicles) that transmit one or more vehicle-based messages for V2X communications. The one or more vehicle-based messages can include C-V2X messages, such as Sensor Data Sharing Messages (SDSMs), Basic Safety Messages (BSMs), Cooperative Awareness Messages (CAMs), Collective Perception Messages (CPMs), and/or other type of messages. The systems and techniques can effectively increase the accuracy of the information exchange (e.g., in the vehicle-based messages) amongst the vehicles, such as by preventing false self-assignment of reputation scores by transmitting devices. While vehicles are used herein as examples of transmitting and receiving devices (transmitting and receiving vehicle-based messages), other types of transmitting and receiving devices may include user equipment (UE) (e.g., pedestrian UEs), road side units (RSUs), network-equipped infrastructure (e.g., a stop light equipped with V2X communication capabilities), any combination thereof, and/or other network-equipped devices. A transmitting device can also be referred to herein as a sender, and a receiving device can also be referred to herein as a receiver.

In some aspects, a central network entity can assign reputation scores (e.g., in the range [0,1]) for one or more devices (e.g., one or more vehicles). In some examples, the central network entity may include a Multi-access Edge Compute (MEC) device or other server device, a base station, and/or other device. For instance, a MEC allows for low-latency V2V communication of vehicle-based messages via a wide area network (Uu) interface for safety and non-safety applications. The central network entity can be utilized to authenticate vehicles and detect those that are misbehaving. In some cases, the central network entity can assign a V2X reputation score to a profile of a vehicle or to a profile of a user of the vehicle (e.g., a user's subscriber identity module (SIM) profile), which can allow the central network entity to determine or calculate the reputation score for a vehicle or user over a period of time as the vehicle travels to various locations. In such cases, when the central network entity acts as a relay in V2V communications, it can embed a V2X reputation score of a source vehicle (from which a message originates) in a message being relayed to a receiving vehicle.

Additionally or alternatively, in some cases, a central V2X reputation score management entity may maintain reputation scores for various vehicles or other devices (in the cloud or possibly collocated with Home Location Register (HLR) and/or American Automobile Association (AAA)

databases). The central V2X reputation score management entity may be the central network entity noted above, or may be a separate entity in communication with one or more central network entities. For instance, in some cases, various central network entities (e.g., MEC entities) can connect to the central entity (e.g., via a publish/subscribe model). In some examples, the one or more central network entities may receive from the central V2X reputation score management entity a user's current reputation score. In some examples, the one or more central network entities may transmit one or more proposals to the central V2X reputation score management entity to update a vehicle's (or user of the vehicle) reputation score based on locally observed behavior of the vehicle or user.

Additionally or alternatively, in some aspects, the systems and techniques described herein may include receiver-assigned reputation scores. In such aspects, a receiving device (e.g., a receiving vehicle) receiving one or more messages from a source device (e.g., source or transmitting vehicle) determines the trustworthiness of the source device and assigns the source device a reputation score (e.g., in the range [0,1]). In such aspects, an originator of a message (e.g., the source device/vehicle) does not advertise a reputation score for itself or for any vehicle or other device for which the originator is reporting information. In some cases, a receiving device (e.g., receiving vehicle) may assign a reputation score per transmitting device/vehicle identifier (ID) (e.g., a tempID) included in a neighbor list (also referred to as a dynamic neighbor list or a Local Dynamic Map (LDM)) maintained by the receiving vehicle. For instance, a neighbor list of a receiving vehicle can include a listing of all of the vehicles and/or objects that are located within a specific predetermined distance (or radius of distance) away from the receiving vehicle. If the receiving device (e.g., receiving vehicle) is able to link a vehicle when an ID assigned to the vehicle changes, then the reputation score of the vehicle can be maintained over longer duration. This can lead to more reliable reputation scores and less of a need to maintain a large set of reputation scores (e.g., by re-calculating a reputation score when an ID for a vehicle changes from one value to another).

In some cases, for each transmitting device ID (e.g., each transmitting vehicle ID), the receiving device (e.g., receiving vehicle) can start from a baseline reputation score (e.g., the reputation score of the first received message from that transmitting device/vehicle). The receiving device may then update the baseline score for the transmitting vehicle based on a sequence of messages it receives from that transmitting device over time. The receiving device may continue to update the reputation score for the transmitting vehicle until the transmitting device ID changes and the receiving device is not able to link a new transmitting device ID to the same vehicle.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

Although beamformed signals are illustrated between UE 104 and base station 102/180, aspects of beamforming may similarly be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. Base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3A:
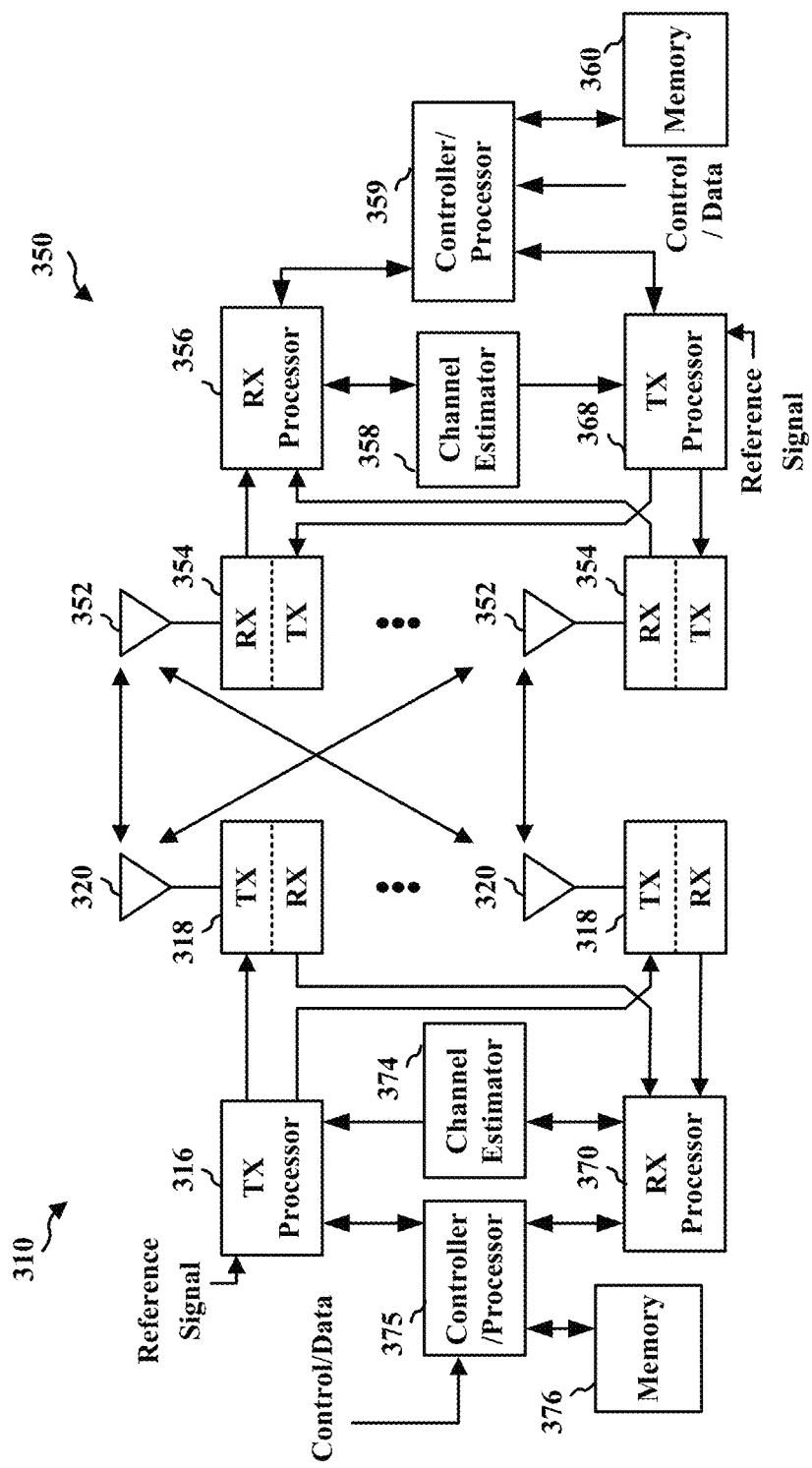
FIG. 3A is a diagram illustrating an example of a first device and a second device involved in wireless communications (e.g., V2V communications, V2X communications, and/or other device-to-device communication), in accordance with some aspects of the present disclosure.

FIG. 3A is a block diagram of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 or 199 of FIG. 1.

Figure 3B:
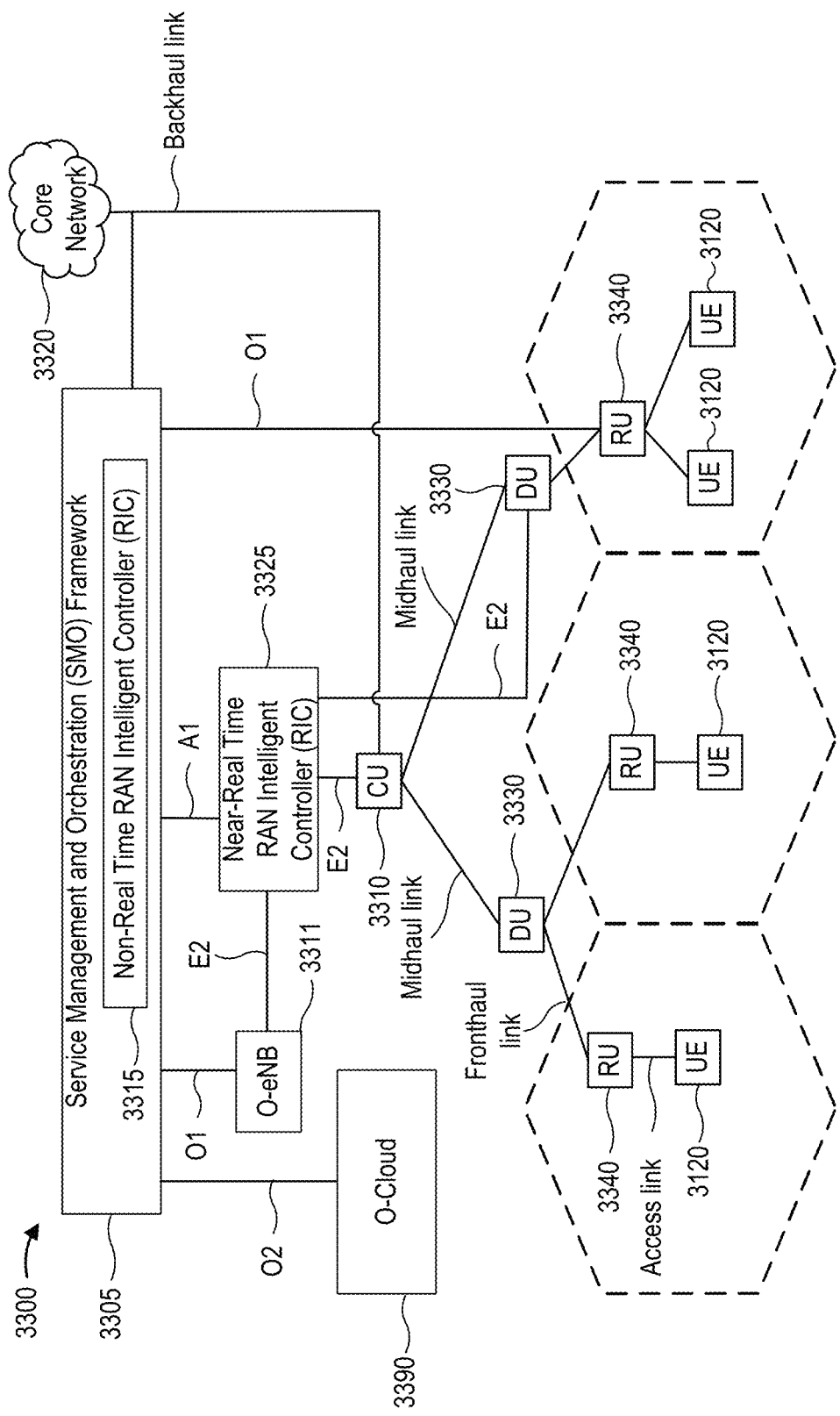
FIG. 3B is a diagram illustrating an example of a disaggregated base station architecture, which may be employed by the disclosed system for assigning a reputation score for communications (e.g., V2X communications), in accordance with some examples.

FIG. 3B is a diagram illustrating an example of a disaggregated base station 3300 architecture, which may be employed by the disclosed system for assigning a reputation score for communications (e.g., V2X communications), in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 3B shows a diagram illustrating an example disaggregated base station 3300 architecture. The disaggregated base station 3300 architecture may include one or more central units (CUs) 3310 that can communicate directly with a core network 3320 via a backhaul link, or indirectly with the core network 3320 through one or more disaggregated base station units (such as a Near-Real Time (Near-RT) RAN Intelligent Controller (RIC) 3325 via an E2 link, or a Non-Real Time (Non-RT) RIC 3315 associated with a Service Management and Orchestration (SMO) Framework 3305, or both). A CU 3310 may communicate with one or more distributed units (DUs) 3330 via respective midhaul links, such as an F1 interface. The DUs 3330 may communicate with one or more radio units (RUs) 3340 via respective fronthaul links. The RUs 3340 may communicate with respective UEs 3120 via one or more RF access links. In some implementations, the UE 3120 may be simultaneously served by multiple RUs 3340.

Each of the units, i.e., the CUs 3310, the DUs 3330, the RUs 3340, as well as the Near-RT RICs 3325, the Non-RT RICs 3315 and the SMO Framework 3305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 3310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 3310. The CU 3310 may be configured to handle user plane functionality (i.e., Central Unit-User Plane (CU-UP)), control plane functionality (i.e., Central Unit-Control Plane (CU-CP)), or a combination thereof. In some implementations, the CU 3310 can be logically split into one or more CU-UP units and one or more CU-CP units. The CU-UP unit can communicate bidirectionally with the CU-CP unit via an interface, such as the E1 interface when implemented in an O-RAN configuration. The CU 3310 can be implemented to communicate with the DU 3330, as necessary, for network control and signaling.

The DU 3330 may correspond to a logical unit that includes one or more base station functions to control the operation of one or more RUs 3340. In some aspects, the DU 3330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 3330 may further host one or more low PHY layers. Each layer (or module) can be implemented with an interface configured to communicate signals with other layers (and modules) hosted by the DU 3330, or with the control functions hosted by the CU 3310.

Lower-layer functionality can be implemented by one or more RUs 3340. In some deployments, an RU 3340, controlled by a DU 3330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 3340 can be implemented to handle over the air (OTA) communication with one or more UEs 3120. In some implementations, real-time and non-real-time aspects of control and user plane communication with the RU(s) 3340 can be controlled by the corresponding DU 3330. In some scenarios, this configuration can enable the DU(s) 3330 and the CU 3310 to be implemented in a cloud-based RAN architecture, such as a vRAN architecture.

The SMO Framework 3305 may be configured to support RAN deployment and provisioning of non-virtualized and virtualized network elements. For non-virtualized network elements, the SMO Framework 3305 may be configured to support the deployment of dedicated physical resources for RAN coverage requirements which may be managed via an operations and maintenance interface (such as an O1 interface). For virtualized network elements, the SMO Framework 3305 may be configured to interact with a cloud computing platform (such as an open cloud (O-Cloud) 3390) to perform network element life cycle management (such as to instantiate virtualized network elements) via a cloud computing platform interface (such as an O2 interface). Such virtualized network elements can include, but are not limited to, CUs 3310, DUs 3330, RUs 3340 and Near-RT RICs 3325. In some implementations, the SMO Framework 3305 can communicate with a hardware aspect of a 4G RAN, such as an open eNB (O-eNB) 3311, via an O1 interface. Additionally, in some implementations, the SMO Framework 3305 can communicate directly with one or more RUs 3340 via an O1 interface. The SMO Framework 3305 also may include a Non-RT RIC 3315 configured to support functionality of the SMO Framework 3305.

The Non-RT RIC 3315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 3325. The Non-RT RIC 3315 may be coupled to or communicate with (such as via an A1 interface) the Near-RT RIC 3325. The Near-RT RIC 3325 may be configured to include a logical function that enables near-real-time control and optimization of RAN elements and resources via data collection and actions over an interface (such as via an E2 interface) connecting one or more CUs 3310, one or more DUs 3330, or both, as well as an O-eNB, with the Near-RT RIC 3325.

In some implementations, to generate AI/ML models to be deployed in the Near-RT RIC 3325, the Non-RT RIC 3315 may receive parameters or external enrichment information from external servers. Such information may be utilized by the Near-RT RIC 3325 and may be received at the SMO Framework 3305 or the Non-RT RIC 3315 from non-network data sources or from network functions. In some examples, the Non-RT RIC 3315 or the Near-RT RIC 3325 may be configured to tune RAN behavior or performance. For example, the Non-RT RIC 3315 may monitor long-term trends and patterns for performance and employ AI/ML models to perform corrective actions through the SMO Framework 3305 (such as reconfiguration via O1) or via creation of RAN management policies (such as A1 policies).

Figure 4:
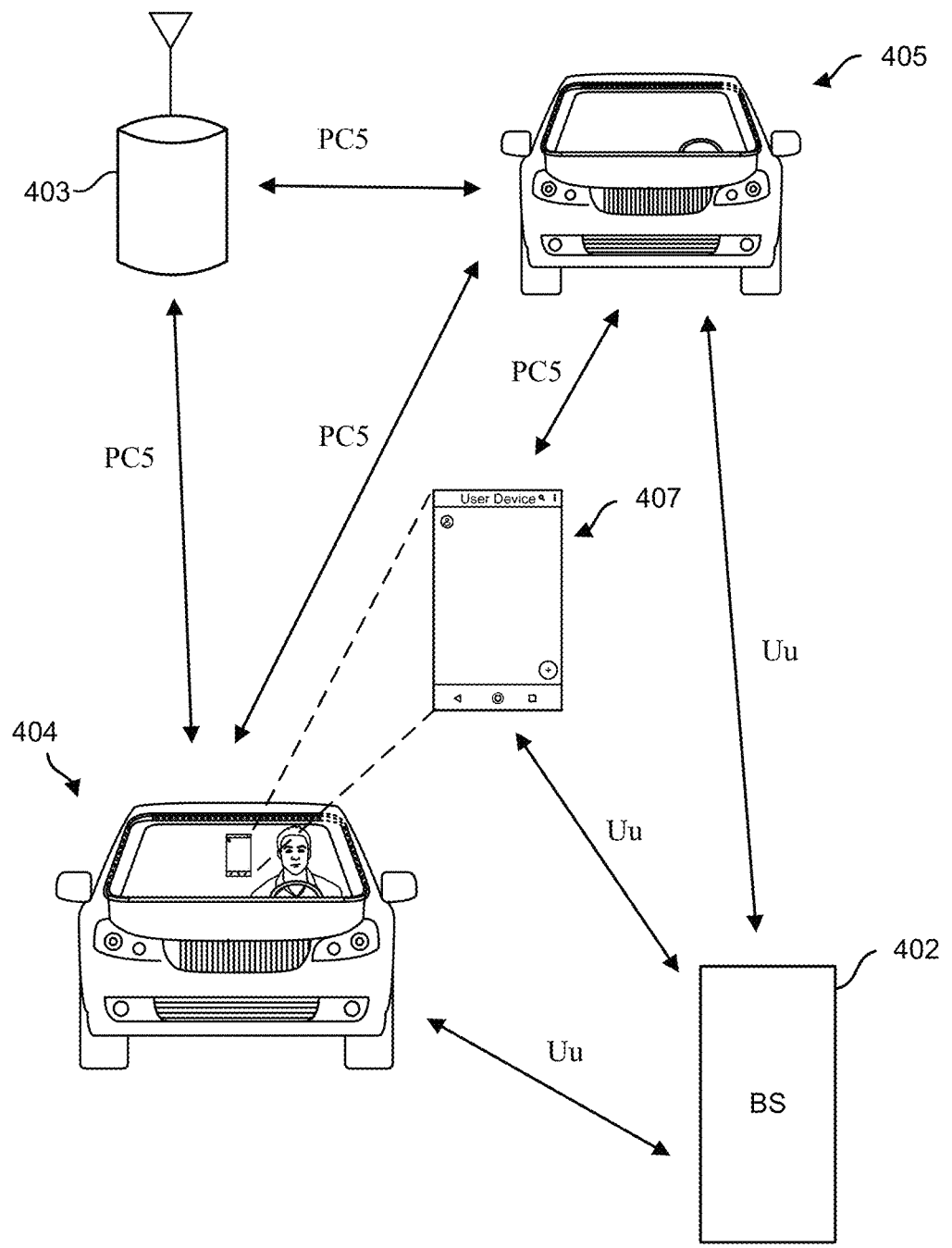
FIG. 4 is a diagram illustrating an example of various user equipment (UEs) communicating over direct communication interfaces (e.g., a cellular based PC5 sidelink interface, 802.11p defined Dedicated Short Range Communication (DSRC) interface, or other direct interface) and wide area network (Uu) interfaces, in accordance with some aspects of the present disclosure.

FIG. 4 illustrates examples of different communication mechanisms used by various UEs. In one example of sidelink communications, FIG. 4 illustrates a vehicle 404, a vehicle 405, and an RSU 403 communicating with each other using PC5, DSRC, or other device to device direct signaling interfaces. In addition, the vehicle 404 and the vehicle 405 may communicate with a base station 402 (shown as BS 402) using a network (Uu) interface. The base station 402 can include a gNB in some examples. FIG. 4 also illustrates a user device 407 communicating with the base station 402 using a network (Uu) interface. As described below, functionalities can be transferred from a vehicle (e.g., vehicle 404) to a user device (e.g., user device 407) based on one or more characteristics or factors (e.g., temperature, humidity, etc.). In one illustrative example, V2X functionality can be transitioned from the vehicle 404 to the user device 407, after which the user device 407 can communicate with other vehicles (e.g., vehicle 405) over a PC5 interface (or other device to device direct interface, such as a DSRC interface), as shown in FIG. 4.

While FIG. 4 illustrates a particular number of vehicles (e.g., two vehicles 404 and 405) communicating with each other and/or with RSU 403, BS 402, and/or user device 407, the present disclosure is not limited thereto. For instance, tens or hundreds of such vehicles may be communicating with one another and/or with RSU 403, BS 402, and/or user device 407. At any given point in time, each such vehicle, RSU 403, BS 402, and/or user device 407 may transmit various types of information as messages to other nearby vehicles resulting in each vehicle (e.g., vehicles 404 and/or 405), RSU 403, BS 402, and/or user device 407 receiving hundreds or thousands of messages from other nearby vehicles, RSUs, base stations, and/or other UEs per second.

While PC5 interfaces are shown in FIG. 4, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 5:
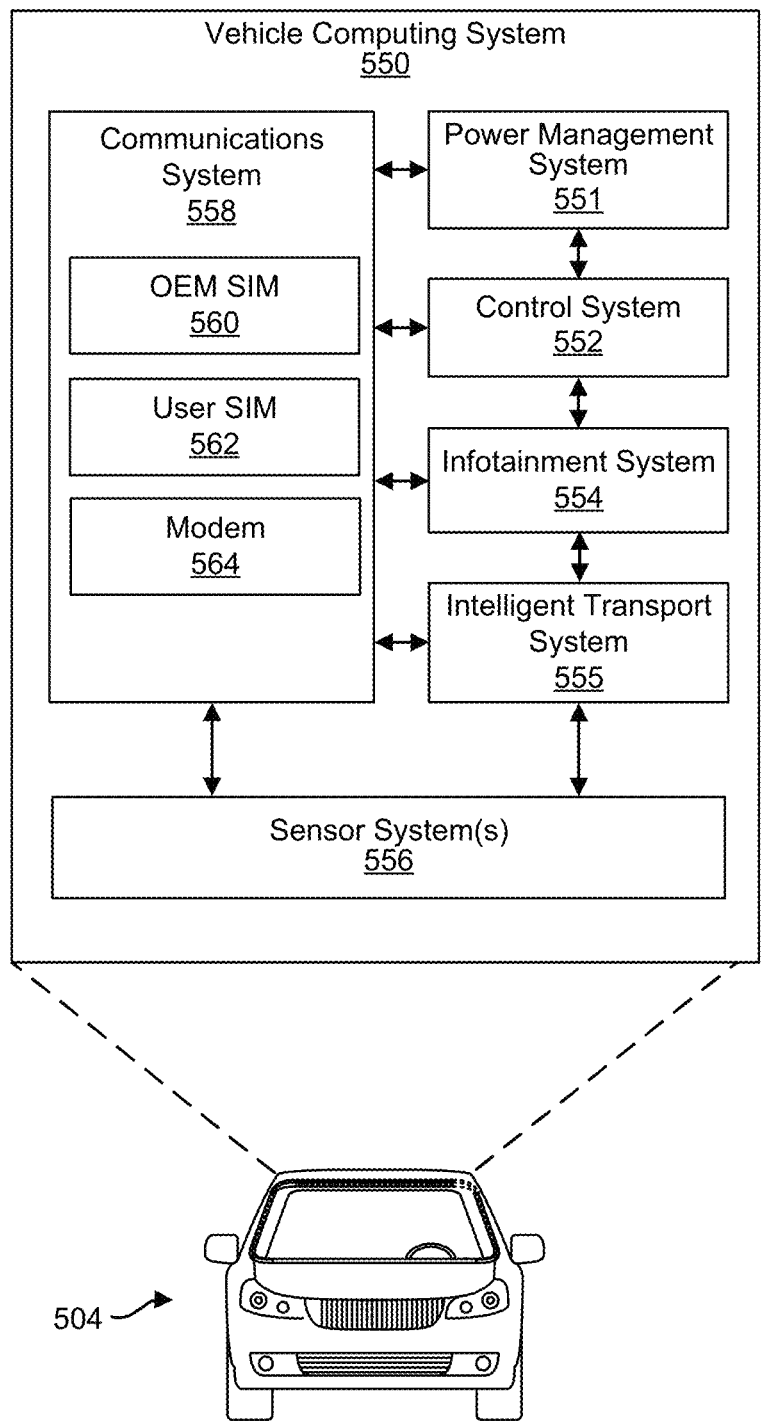
FIG. 5 is a block diagram illustrating an example of a computing system of a vehicle, in accordance with some aspects of the present disclosure.

FIG. 5 is a block diagram illustrating an example a vehicle computing system 550 of a vehicle 504. The vehicle 504 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 550 can include at least a power management system 551, an infotainment system 554, an intelligent transport system (ITS) 555, one or more sensor systems 556, and a communications system 558. In some cases, the vehicle computing system 550 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 552 can be configured to control one or more operations of the vehicle 504, the power management system 551, the computing system 550, the infotainment system 554, the ITS 555, and/or one or more other systems of the vehicle 504 (e.g., a braking system, a steering system, a safety system other than the ITS 555, a cabin system, and/or other system). In some examples, the control system 552 can include one or more electronic control units (ECUs). An ECU can control one or more of the electrical systems or subsystems in a vehicle. Examples of specific ECUs that can be included as part of the control system 552 include an engine control module (ECM), a powertrain control module (PCM), a transmission control module (TCM), a brake control module (BCM), a central control module (CCM), a central timing module (CTM), among others. In some cases, the control system 552 can receive sensor signals from the one or more sensor systems 556 and can communicate with other systems of the vehicle computing system 550 to operate the vehicle 504.

The vehicle computing system 550 also includes a power management system 551. In some implementations, the power management system 551 can include a power management integrated circuit (PMIC), a standby battery, and/or other components. In some cases, other systems of the vehicle computing system 550 can include one or more PMICs, batteries, and/or other components. The power management system 551 can perform power management functions for the vehicle 504, such as managing a power supply for the computing system 550 and/or other parts of the vehicle. For example, the power management system 551 can provide a stable power supply in view of power fluctuations, such as based on starting an engine of the vehicle. In another example, the power management system 551 can perform thermal monitoring operations, such as by checking ambient and/or transistor junction temperatures. In another example, the power management system 551 can perform certain functions based on detecting a certain temperature level, such as causing a cooling system (e.g., one or more fans, an air conditioning system, etc.) to cool certain components of the vehicle computing system 550 (e.g., the control system 552, such as one or more ECUs), shutting down certain functionalities of the vehicle computing system 550 (e.g., limiting the infotainment system 554, such as by shutting off one or more displays, disconnecting from a wireless network, etc.), among other functions.

The vehicle computing system 550 further includes a communications system 558. The communications system 558 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 558 is configured to transmit and receive information wirelessly over any suitable wireless network (e.g., a 3G network, 4G network, 5G network, WiFi network, Bluetooth™ network, and/or other network). The communications system 558 includes various components or devices used to perform the wireless communication functionalities, including an original equipment manufacturer (OEM) subscriber identity module (referred to as a SIM or SIM card) 560, a user SIM 562, and a modem 564. While the vehicle computing system 550 is shown as having two SIMs and one modem, the computing system 550 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 560 can be used by the communications system 558 for establishing a wireless connection for vehicle-based operations, such as for conducting emergency-calling (eCall) functions, communicating with a communications system of the vehicle manufacturer (e.g., for software updates, etc.), among other operations. The OEM SIM 560 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 562 can be used by the communications system 558 for performing wireless network access functions in order to support a user data connection (e.g., for conducting phone calls, messaging, Infotainment related services, among others). In some cases, a user device of a user can connect with the vehicle computing system 550 over an interface (e.g., over PC5, Bluetooth™, WiFI™ (e.g., DSRC), a universal serial bus (USB) port, and/or other wireless or wired interface). Once connected, the user device can transfer wireless network access functionality from the user device to communications system 558 the vehicle, in which case the user device can cease performance of the wireless network access functionality (e.g., during the period in which the communications system 558 is performing the wireless access functionality). The communications system 558 can begin interacting with a base station to perform one or more wireless communication operations, such as facilitating a phone call, transmitting and/or receiving data (e.g., messaging, video, audio, etc.), among other operations. In such cases, other components of the vehicle computing system 550 can be used to output data received by the communications system 558. For example, the infotainment system 554 (described below) can display video received by the communications system 558 on one or more displays and/or can output audio received by the communications system 558 using one or more speakers.

A modem is a device that modulates one or more carrier wave signals to encode digital information for transmission, and demodulates signals to decode the transmitted information. The modem 564 (and/or one or more other modems of the communications system 558) can be used for communication of data for the OEM SIM 560 and/or the user SIM 562. In some examples, the modem 564 can include a 4G (or LTE) modem and another modem (not shown) of the communications system 558 can include a 5G (or NR) modem. In some examples, the communications system 558 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 564 (and/or one or more other modems of the communications system 558) can be used for performing V2X communications (e.g., with other vehicles for V2V communications, with other devices for D2D communications, with infrastructure systems for V2I communications, with pedestrian UEs for V2P communications, etc.). In some examples, the communications system 558 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 558 can be or can include a telematics control unit (TCU). In some implementations, the TCU can include a network access device (NAD) (also referred to in some cases as a network control unit or NCU). The NAD can include the modem 564, any other modem not shown in FIG. 5, the OEM SIM 560, the user SIM 562, and/or other components used for wireless communications. In some examples, the communications system 558 can include a Global Navigation Satellite System (GNSS). In some cases, the GNSS can be part of the one or more sensor systems 556, as described below. The GNSS can provide the ability for the vehicle computing system 550 to perform one or more location services, navigation services, and/or other services that can utilize GNSS functionality.

In some cases, the communications system 558 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 504 to communicate with a network and/or other UEs.

The vehicle computing system 550 can also include an infotainment system 554 that can control content and one or more output devices of the vehicle 504 that can be used to output the content. The infotainment system 554 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 504), and/or other output device.

In some examples, the computing system 550 can include the intelligent transport system (ITS) 555. In some examples, the ITS 555 can be used for implementing V2X communications. For example, an ITS stack of the ITS 555 can generate V2X messages based on information from an application layer of the ITS. In some cases, the application layer can determine whether certain conditions have been met for generating messages for use by the ITS 555 and/or for generating messages that are to be sent to other vehicles (for V2V communications), to pedestrian UEs (for V2P communications), and/or to infrastructure systems (for V2I communications). In some cases, the communications system 558 and/or the ITS 555 can obtain car access network (CAN) information (e.g., from other components of the vehicle via a CAN bus). In some examples, the communications system 558 (e.g., a TCU NAD) can obtain the CAN information via the CAN bus and can send the CAN information to a PHY/MAC layer of the ITS 555. The ITS 555 can provide the CAN information to the ITS stack of the ITS 555. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 555.

The conditions used to determine whether to generate messages can be determined using the CAN information based on safety-related applications and/or other applications, including applications related to road safety, traffic efficiency, infotainment, business, and/or other applications. In one illustrative example, the ITS 555 can perform lane change assistance or negotiation. For instance, using the CAN information, the ITS 555 can determine that a driver of the vehicle 504 is attempting to change lanes from a current lane to an adjacent lane (e.g., based on a blinker being activated, based on the user veering or steering into an adjacent lane, etc.). Based on determining the vehicle 504 is attempting to change lanes, the ITS 555 can determine a lane-change condition has been met that is associated with a message to be sent to other vehicles that are nearby the vehicle in the adjacent lane. The ITS 555 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 504, such as based on V2P communications with a UE of the user), traffic sign recognition, among others.

The ITS 555 can use any suitable protocol to generate messages (e.g., V2X messages). Examples of protocols that can be used by the ITS 555 include one or more Society of Automotive Engineering (SAE) standards, such as SAE J2735, SAE J2945, SAE J3161, and/or other standards, which are hereby incorporated by reference in their entirety and for all purposes.

A security layer of the ITS 555 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 555 can be signed by the security layer of the ITS 555. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 555 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 552) to perform automatic functions, such as automatic breaking, automatic steering (e.g., to maintain a heading in a particular lane), automatic lane change negotiation with other vehicles, among other automatic functions. In one illustrative example, a message can be received by the communications system 558 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 552, which can cause the control system 552 to automatically break the vehicle 504 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 555 can receive a large number of messages from the other UEs (e.g., vehicles, RSUs, etc.), in which case the ITS 555 will authenticate (e.g., decode and decrypt) each of the messages and/or determine which operations to perform. Such a large number of messages can lead to a large computational load for the vehicle computing system 550. In some cases, the large computational load can cause a temperature of the computing system 550 to increase. Rising temperatures of the components of the computing system 550 can adversely affect the ability of the computing system 550 to process the large number of incoming messages. One or more functionalities can be transitioned from the vehicle 504 to another device (e.g., a user device, a RSU, etc.) based on a temperature of the vehicle computing system 550 (or component thereof) exceeding or approaching one or more thermal levels. Transitioning the one or more functionalities can reduce the computational load on the vehicle 504, helping to reduce the temperature of the components. A thermal load balancer can be provided that enable the vehicle computing system 550 to perform thermal based load balancing to control a processing load depending on the temperature of the computing system 550 and processing capacity of the vehicle computing system 550.

The computing system 550 further includes one or more sensor systems 556 (e.g., a first sensor system through an Nth sensor system, where N is a value equal to or greater than 0). When including multiple sensor systems, the sensor system(s) 556 can include different types of sensor systems that can be arranged on or in different parts the vehicle 504. The sensor system(s) 556 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 550 of the vehicle 504.

While the vehicle computing system 550 is shown to include certain components and/or systems, one of ordinary skill will appreciate that the vehicle computing system 550 can include more or fewer components than those shown in FIG. 5. For example, the vehicle computing system 550 can also include one or more input devices and one or more output devices (not shown). In some implementations, the vehicle computing system 550 can also include (e.g., as part of or separate from the control system 552, the infotainment system 554, the communications system 558, and/or the sensor system(s) 556) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 6:
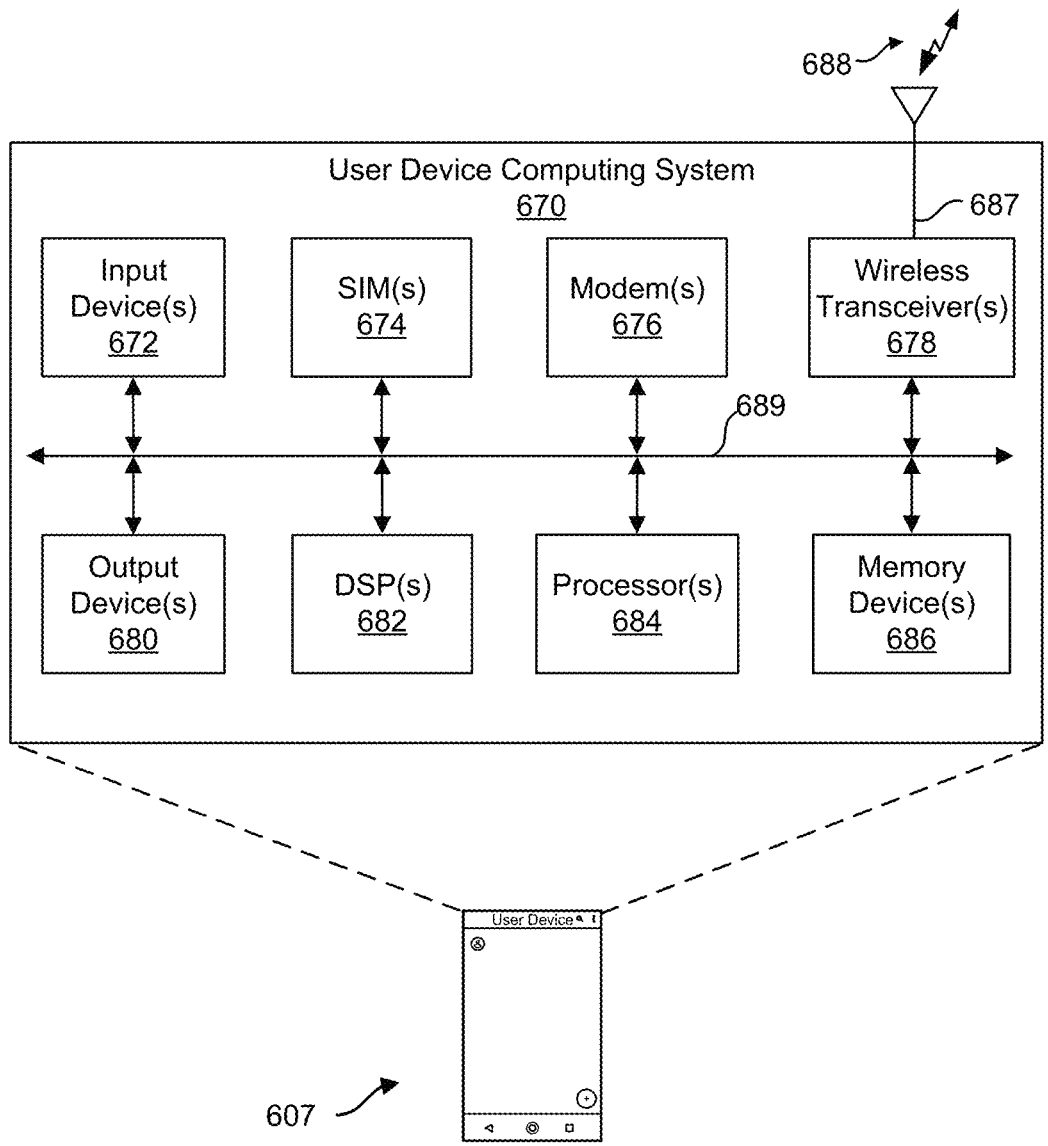
FIG. 6 is a block diagram illustrating an example of a computing system of a user device, in accordance with some aspects of the present disclosure.

FIG. 6 illustrates an example of a computing system 670 of a user device 607. The user device 607 is an example of a UE that can be used by an end-user. For example, the user device 607 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 670 includes software and hardware components that can be electrically or communicatively coupled via a bus 689 (or may otherwise be in communication, as appropriate). For example, the computing system 670 includes one or more processors 684. The one or more processors 684 can include one or more CPUs, ASICs, FPGAs, APs, GPUs, VPUs, NSPs, microcontrollers, dedicated hardware, any combination thereof, and/or other processing device or system. The bus 689 can be used by the one or more processors 684 to communicate between cores and/or with the one or more memory devices 686.

The computing system 670 may also include one or more memory devices 686, one or more digital signal processors (DSPs) 682, one or more SIMs 674, one or more modems 676, one or more wireless transceivers 678, an antenna 687, one or more input devices 672 (e.g., a camera, a mouse, a keyboard, a touch sensitive screen, a touch pad, a keypad, a microphone, and/or the like), and one or more output devices 680 (e.g., a display, a speaker, a printer, and/or the like).

The one or more wireless transceivers 678 can receive wireless signals (e.g., signal 688) via antenna 687 from one or more other devices, such as other user devices, vehicles (e.g., vehicle 504 of FIG. 5 described above), network devices (e.g., base stations such as eNBs and/or gNBs, WiFI routers, etc.), cloud networks, and/or the like. In some examples, the computing system 670 can include multiple antennae. The wireless signal 688 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 678 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 688 into a baseband or intermediate frequency and can convert the RF signals to the digital domain.

In some cases, the computing system 670 can include a coding-decoding device (or CODEC) configured to encode and/or decode data transmitted and/or received using the one or more wireless transceivers 678. In some cases, the computing system 670 can include an encryption-decryption device or component configured to encrypt and/or decrypt data (e.g., according to the AES and/or DES standard) transmitted and/or received by the one or more wireless transceivers 678.

The one or more SIMs 674 can each securely store an IMSI number and related key assigned to the user of the user device 607. As noted above, the IMSI and key can be used to identify and authenticate the subscriber when accessing a network provided by a network service provider or operator associated with the one or more SIMs 674. The one or more modems 676 can modulate one or more signals to encode information for transmission using the one or more wireless transceivers 678. The one or more modems 676 can also demodulate signals received by the one or more wireless transceivers 678 in order to decode the transmitted information. In some examples, the one or more modems 676 can include a 4G (or LTE) modem, a 5G (or NR) modem, a modem configured for V2X communications, and/or other types of modems. The one or more modems 676 and the one or more wireless transceivers 678 can be used for communicating data for the one or more SIMs 674.

The computing system 670 can also include (and/or be in communication with) one or more non-transitory machine-readable storage media or storage devices (e.g., one or more memory devices 686), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 686 and executed by the one or more processor(s) 684 and/or the one or more DSPs 682. The computing system 670 can also include software elements (e.g., located within the one or more memory devices 686), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 7:
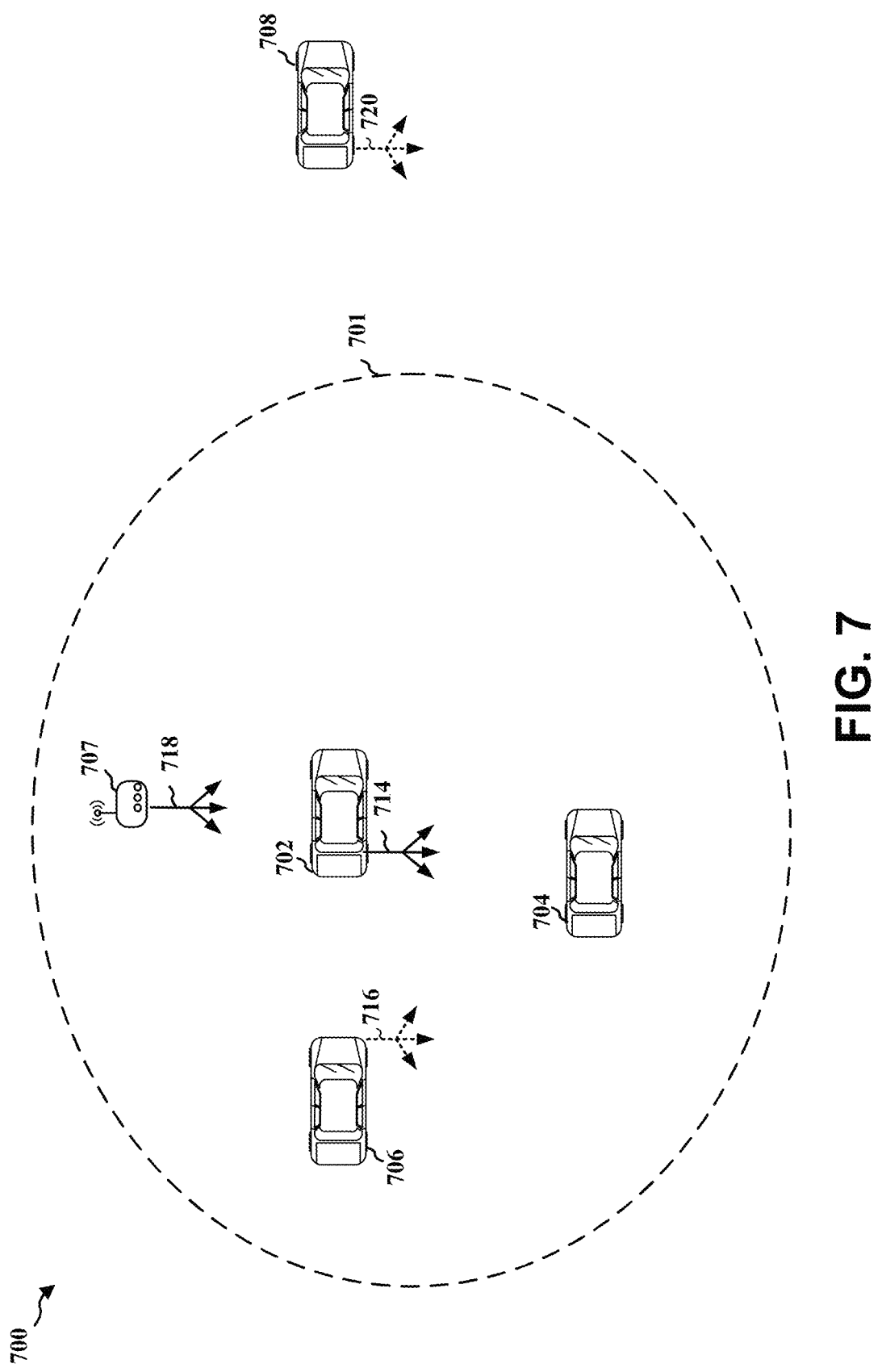
FIG. 7 is a diagram illustrating an example of devices involved in wireless communications (e.g., sidelink communications), in accordance with some aspects of the present disclosure.

FIG. 7 illustrates an example 700 of wireless communication between devices based on sidelink communication, such as V2X or other D2D communication. The communication may be based on a slot structure comprising aspects described in connection with FIG. 2. For example, transmitting UE 702 may transmit a transmission 714, e.g., comprising a control channel and/or a corresponding data channel, that may be received by receiving UEs 704, 706, 708. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 702, 704, 706, 708 may each be capable of operating as a transmitting device in addition to operating as a receiving device. Thus, UEs 706, 708 are illustrated as transmitting transmissions 716, 720. The transmissions 714, 716, 720 (and 718 by RSU 707) may be broadcast or multicast to nearby devices. For example, UE 714 may transmit communication intended for receipt by other UEs within a range 701 of UE 714. Additionally/alternatively, RSU 707 may receive communication from and/or transmit communication 718 to UEs 702, 704, 706, 708.

UE 702, 704, 706, 708 or RSU 707 may comprise a detection component, similar to 198 described in connection with FIG. 1. UE 702, 704, 706, 708 or RSU 707 may also comprise a BSM or mitigation component, similar to 199 described in connection with FIG. 1.

Figure 8A:
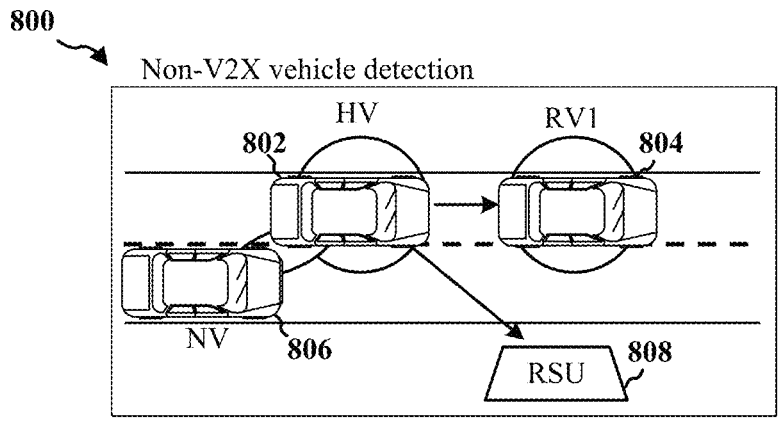
FIGS. 8A-8D are diagrams illustrating examples of sensor-sharing for cooperative and automated driving systems, in accordance with some aspects of the present disclosure.
Figure 8B:
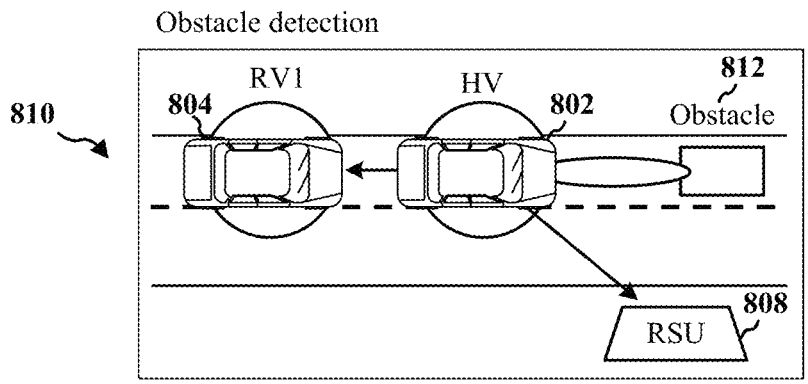
Figure 8C:
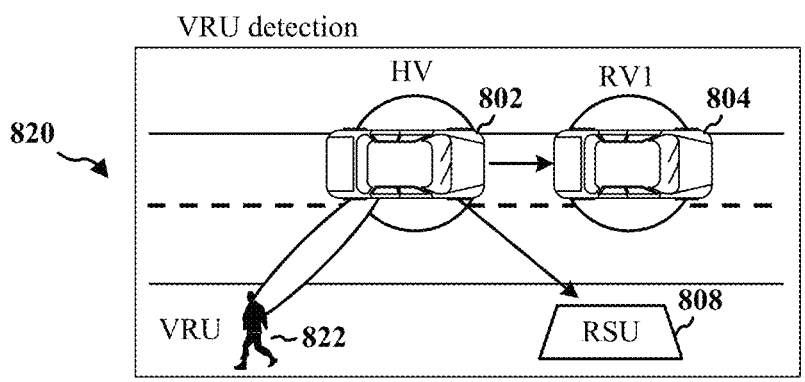
Figure 8D:
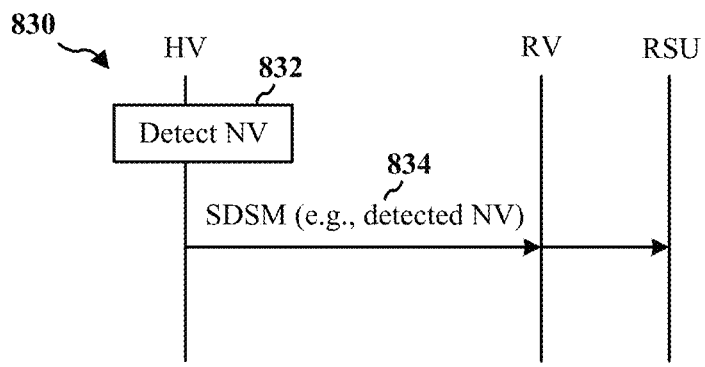
Figure 9:
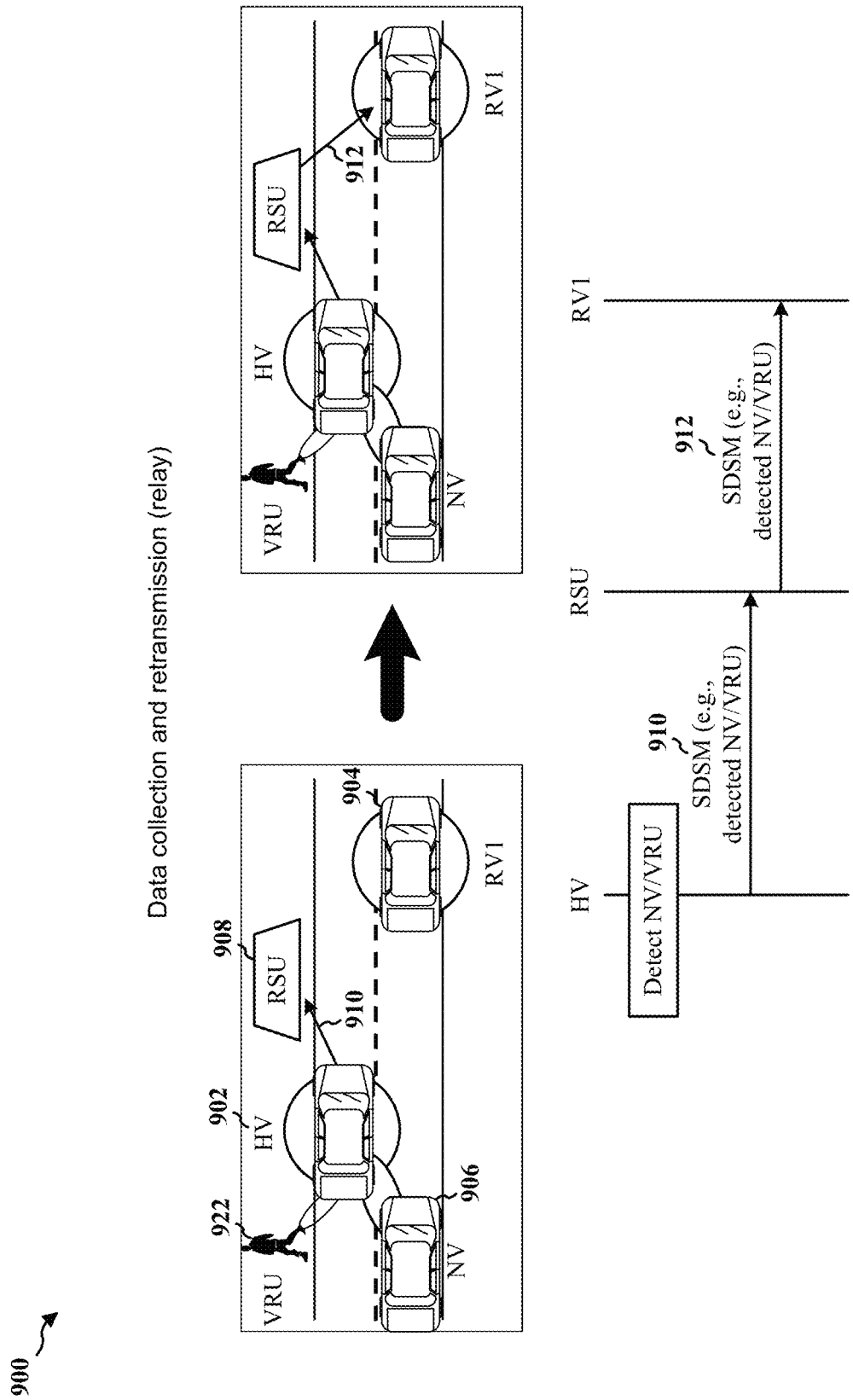
FIG. 9 is a diagram illustrating an example of sensor-sharing for cooperative and automated driving systems, in accordance with some aspects of the present disclosure.

In wireless communications, such as V2X communications, V2X entities may perform sensor sharing with other V2X entities for cooperative and automated driving. For example, with reference to diagram 800 of FIG. 8A, the host vehicle (HV) 802 may detect a number of items within its environment. For example, the HV 802 may detect the presence of the non-V2X entity (NV) 806 at block 832. The HV 802 may inform other entities, such as a first remote vehicle (RV1) 804 or a road side unit (RSU) 808, about the presence of the NV 806, if the RV1 804 and/or the RSU 808, by themselves, are unable to detect the NV 806. The HV 802 informing the RV1 804 and/or the RSU 808 about the NV 806 is a sharing of sensor information. With reference to diagram 810 of FIG. 8B, the HV 802 may detect a physical obstacle 812, such as a pothole, debris, or an object that may be an obstruction in the path of the HV 802 and/or RV1 804 that has not yet been detected by RV1 804 and/or RSU 808. The HV 802 may inform the RV1 and/or the RSU 808 of the obstacle 812, such that the obstacle 812 may be avoided. With reference to diagram 820 of FIG. 8C, the HV 802 may detect the presence of a vulnerable road user (VRU) 822 and may share the detection of the VRU 822 with the RV1 804 and the RSU 808, in instances where the RSU 808 and/or RV1 804 may not be able to detect the VRU 822. With reference to diagram 830 of FIG. 8D, the HV, upon detection of a nearby entity (e.g., NV, VRU, obstacle) may transmit a sensor data sharing message (SDSM) 834 to the RV and/or the RSU to share the detection of the entity. The SDSM 834 may be a broadcast message such that any receiving device within the vicinity of the HV may receive the message. In some instances, the shared information may be relayed to other entities, such as RVs. For example, with reference to diagram 900 of FIG. 9, the HV 902 may detect the presence of the NV 906 and/or the VRU 922. The HV 902 may broadcast the SDSM 910 to the RSU 908 to report the detection of NV 906 and/or VRU 922. The RSU 908 may relay the SDSM 910 received from the HV 902 to remote vehicles such that the remote vehicles are aware of the presence of the NV 906 and/or VRU 922. For example, the RSU 908 may transmit an SDSM 912 to the RV1 904, where the SDSM 912 includes information related to the detection of NV 906 and/or VRU 922.

Figure 10:
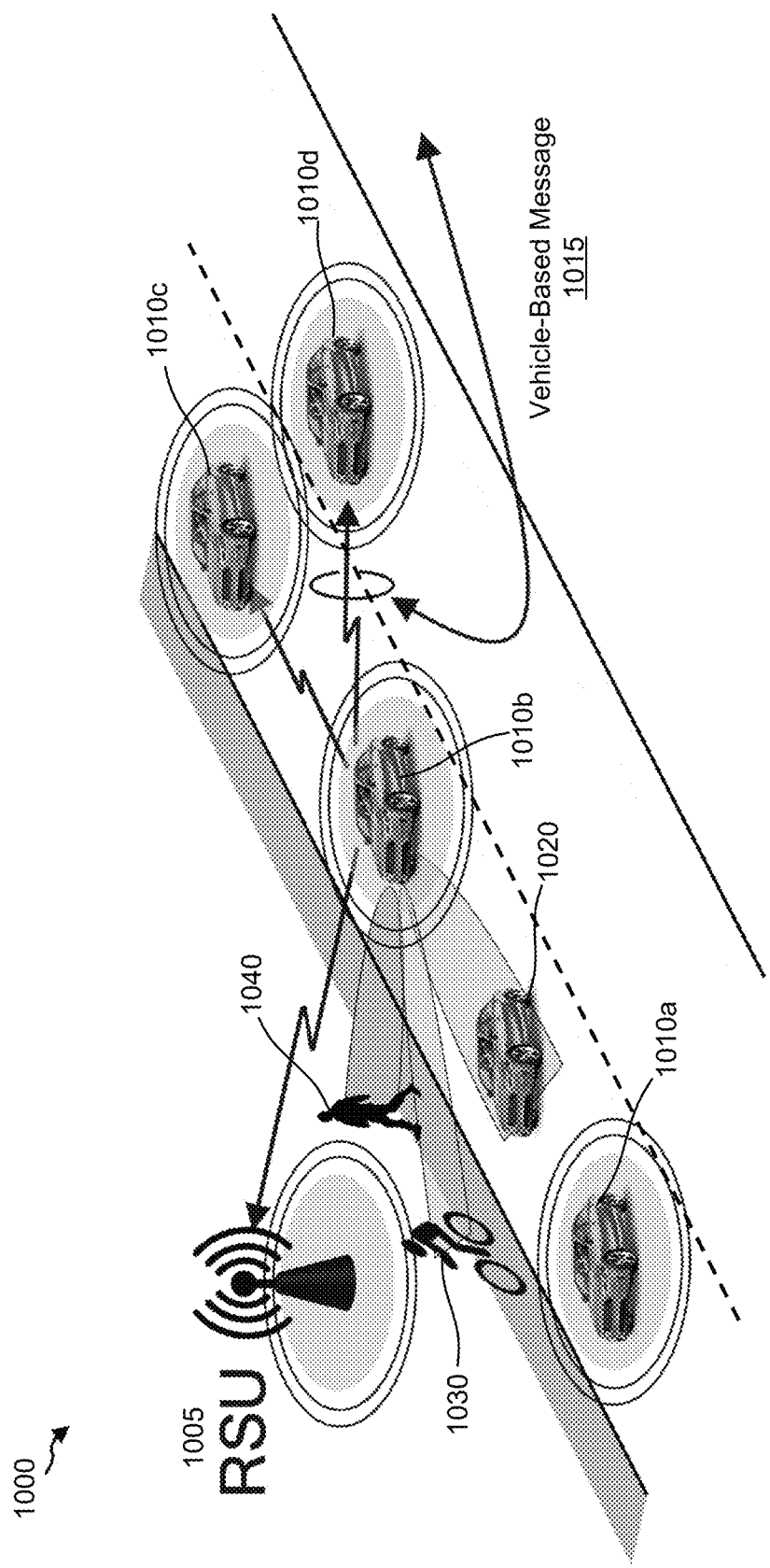
FIG. 10 is a diagram illustrating an example of a system for sensor sharing in communications (e.g., V2X communications), in accordance with some aspects of the present disclosure.

FIG. 10 is a diagram illustrating an example of a system 1000 for sensor sharing in V2X (e.g., V2X communications), in accordance with some aspects of the present disclosure. In FIG. 10, the system 1000 is shown to include a plurality of equipped (e.g., V2X capable) network devices. The plurality of equipped network devices includes vehicles (e.g., automobiles) 1010a, 1010b, 1010c, 1010d, and an RSU 1005. Also shown are a plurality of non-equipped network devices, which include a non-equipped vehicle 1020, a VRU (e.g., a bicyclist) 1030, and a pedestrian 1040. The system 1000 may comprise more or less equipped network devices and/or more or less non-equipped network devices, than as shown in FIG. 10. In addition, the system 1000 may comprise more or less different types of equipped network devices (e.g., which may include equipped UEs) and/or more or less different types of non-equipped network devices (e.g., which may include non-equipped UEs) than as shown in FIG. 10. In addition, in one or more examples, the equipped network devices may be equipped with heterogeneous capability, which may include, but is not limited to, C-V2X/DSRC capability, 4G/5G cellular connectivity, GPS capability, camera capability, radar capability, and/or LIDAR capability.

The plurality of equipped network devices may be capable of performing V2X communications. In addition, at least some of the equipped network devices are configured to transmit and receive sensing signals for radar (e.g., RF sensing signals) and/or LIDAR (e.g., optical sensing signals) to detect nearby vehicles and/or objects. Additionally or alternatively, in some cases, at least some of the equipped network devices are configured to detect nearby vehicles and/or objects using one or more cameras (e.g., by processing images captured by the one or more cameras to detect the vehicles/objects). In one or more examples, vehicles 1010a, 1010b, 1010c, 1010d and RSU 1005 may be configured to transmit and receive sensing signals of some kind (e.g., radar and/or LIDAR sensing signals).

In some examples, some of the equipped network devices may have higher capability sensors (e.g., GPS receivers, cameras, RF antennas, and/or optical lasers and/or optical sensors) than other equipped network devices of the system 1000. For example, vehicle 1010b may be a luxury vehicle and, as such, have more expensive, higher capability sensors than other vehicles that are economy vehicles. In one illustrative example, vehicle 1010b may have one or more higher capability LIDAR sensors (e.g., high capability optical lasers and optical sensors) than the other equipped network devices in the system 1000. In one illustrative example, a LIDAR of vehicle 1010b may be able to detect a VRU (e.g., cyclist) 1030 and/or a pedestrian 1040 with a large degree of confidence (e.g., a seventy percent degree of confidence). In another example, vehicle 1010b may have higher capability radar (e.g., high capability RF antennas) than the other equipped network devices in the system 1000. For instance, the radar of vehicle 1010b may be able to detect the VRU (e.g., cyclist) 1030 and/or pedestrian 1040 with a degree of confidence (e.g., an eight-five percent degree of confidence). In another example, vehicle 1010b may have higher capability camera (e.g., with higher resolution capabilities, higher frame rate capabilities, better lens, etc.) than the other equipped network devices in the system 1000.

During operation of the system 1000, the equipped network devices (e.g., RSU 1005 and/or at least one of the vehicles 1010a, 1010b, 1010c, 1010d) may transmit and/or receive sensing signals (e.g., RF and/or optical signals) to sense and detect vehicles (e.g., vehicles 1010a, 1010b, 1010c, 1010d, and 1020) and/or objects (e.g., VRU 1030 and pedestrian 1040) located within and surrounding the road.

The equipped network devices (e.g., RSU 1005 and/or at least one of the vehicles 1010*a*, 1010*b*, 1010*c*, 1010*d*) may then use the sensing signals to determine characteristics (e.g., motion, dimensions, type, heading, and speed) of the detected vehicles and/or objects. The equipped network devices (e.g., RSU 1005 and/or at least one of the vehicles 1010*a*, 1010*b*, 1010*c*, 1010*d*) may generate at least one vehicle-based message 1015 (e.g., a C-V2X message, such as a Sensor Data Sharing Message (SDSM), a Basic Safety Message (BSM), a Cooperative Awareness Message (CAM), Collective Perception Messages (CPMs), and/or other type of message) including information related to the determined characteristics of the detected vehicles and/or objects.

The vehicle-based message 1015 may include information related to the detected vehicle or object (e.g., a position of the vehicle or object, an accuracy of the position, a speed of the vehicle or object, a direction in which the vehicle or object is traveling, and/or other information related to the vehicle or object), traffic conditions (e.g., low speed and/or dense traffic, high speed traffic, information related to an accident, etc.), weather conditions (e.g., rain, snow, etc.), message type (e.g., an emergency message, a non-emergency or "regular" message), etc.), road topology (line-of-sight (LOS) or non-LOS (NLOS), etc.), any combination, thereof, and/or other information. In some examples, the vehicle-based message 1015 may also include information regarding the equipped network device's preference to receive vehicle-based messages from other certain equipped network devices. In some cases, the vehicle-based message 1015 may include the current capabilities of the equipped network device (e.g., vehicles 1010*a*, 1010*b*, 1010*c*, 1010*d*), such as the equipped network device's sensing capabilities (which can affect the equipped network device's accuracy in sensing vehicles and/or objects), processing capabilities, the equipped network device's thermal status (which can affect the vehicle's ability to process data), and the equipped network device's state of health.

In some aspects, the vehicle-based message 1015 may include a dynamic neighbor list (also referred to as a Local Dynamic Map (LDM) or a dynamic surrounding map) for each of the equipped network devices (e.g., vehicles 1010*a*, 1010*b*, 1010*c*, 1010*d* and RSU 1005). For example, each dynamic neighbor list can include a listing of all of the vehicles and/or objects that are located within a specific predetermined distance (or radius of distance) away from a corresponding equipped network device. In some cases, each dynamic neighbor list includes a mapping, which may include roads and terrain topology, of all of the vehicles and/or objects that are located within a specific predetermined distance (or radius of distance) away from a corresponding equipped network device.

In some implementations, the vehicle-based message 1015 may include a specific use case or safety warning, such as a do-not-pass warning (DNPW) or a forward collision warning (FCW), related to the current conditions of the equipped network device (e.g., vehicles 1010*a*, 1010*b*, 1010*c*, 1010*d*). In some examples, the vehicle-based message 1015 may be in the form of a standard Basic Safety Message (BSM), a Cooperative Awareness Message (CAM), a Collective Perception Message (CPM), a Sensor Data Sharing Message (SDSM) (e.g., SAE J3224 SDSM), and/or other format.

Figure 11:
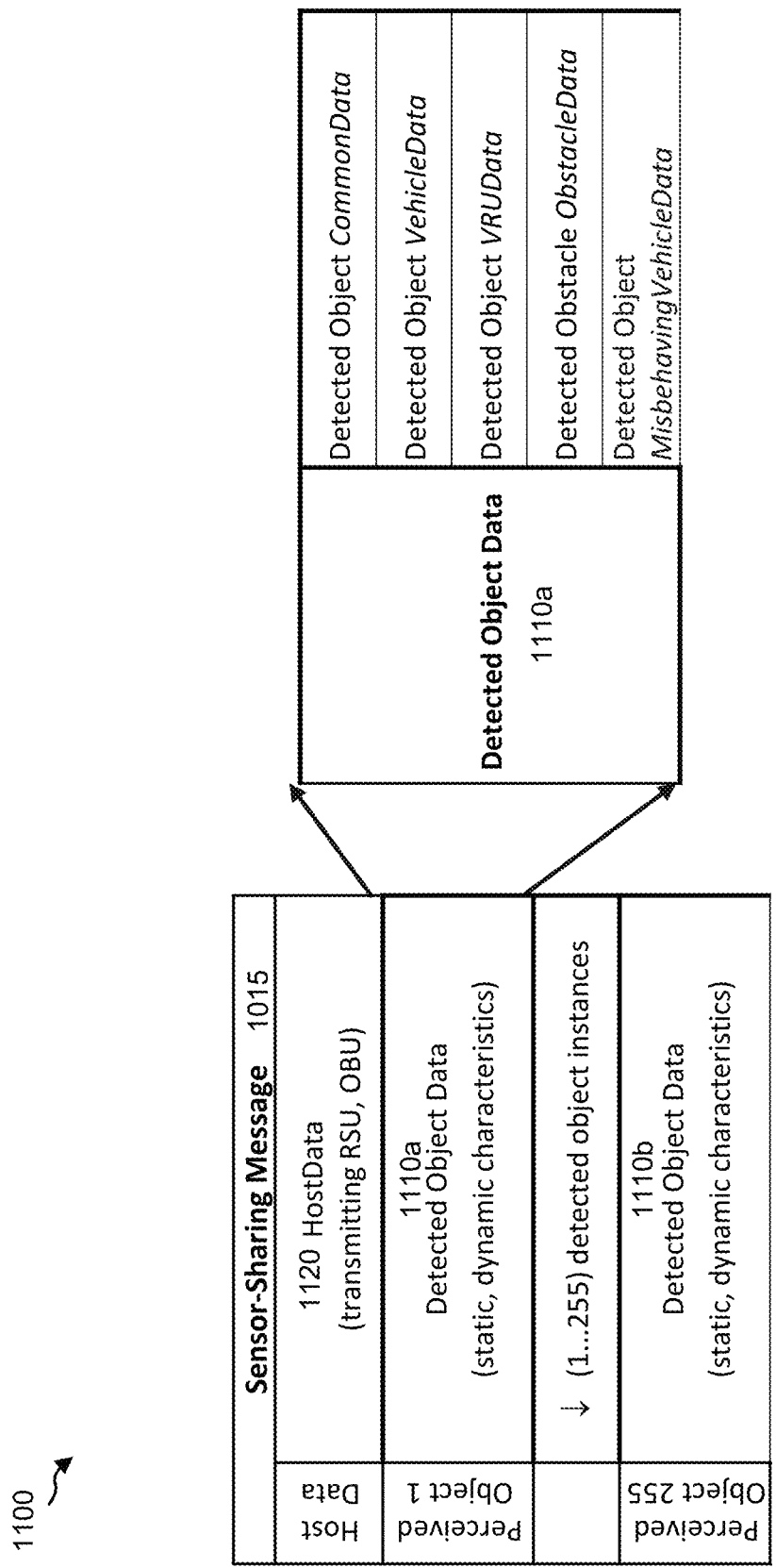
FIG. 11 is a diagram illustrating an example of a vehicle-based message (shown as a sensor-sharing message), in accordance with some aspects of the present disclosure.

FIG. 11 is a diagram 1100 illustrating an example of a vehicle-based message 1015, in accordance with some aspects of the present disclosure. The vehicle-based message 1015 is shown as a sensor-sharing message (e.g., an SDSM), but can include a BSM, a CAM, a CPM, or other vehicle-based message as noted herein. In FIG. 11, the vehicle-based message 1015 is shown to include HostData 1120 and Detected Object Data 1110*a*, 1110*b*. The HostData 1120 of the vehicle-based message 1015 may include information related to the transmitting device (e.g., the transmitting equipped network entity, such as RSU 1005 or an onboard unit (OBU), such as on vehicles 1010*a*, 1010*b*, 1010*c*, 1010*d*) of the vehicle-based message 1015. The Detected Object Data 1110*a*, 1110*b* of the vehicle-based message 1015 may include information related to the detected vehicle or object (e.g., static or dynamic characteristics related to the detected vehicle or object, and/or other information related to the detected vehicle or object). The Detected Object Data 1110*a*, 1110*b* may specifically include Detected Object CommonData, Detected Object VehicleData, Detected Object VRUData, Detected Obstacle ObstacleData, and Detected Object MisbehavingVehicleData.

These vehicle-based messages 1015 are beneficial because they can provide an awareness and understanding to the equipped network devices (e.g., vehicles 1010*a*, 1010*b*, 1010*c*, 1010*d* of FIG. 10) of upcoming potential road dangers (e.g., unforeseen oncoming vehicles, accidents, and road conditions). In the context of sensor sharing or the sharing of other information in communications (e.g., V2X communications), receiving devices (e.g., equipped network devices that receive vehicle-based messages 1015) can benefit from having a reputation score assigned to transmitting devices (e.g., equipped network devices that generate and send the vehicle-based messages 1015) to weigh the accuracy (e.g., relating to the accuracy of the sensors and/or information reported in the messages) and/or validity of the sensing information contained within the vehicle-based messages 1015. For example, the accuracy and/or validity can be with respect to whether the transmitting device is misbehaving by reporting incorrect information or has low-quality sensors (e.g., radar, LIDAR, camera, GNSS, or other sensors) that result in information that is completely or partially inaccurate (e.g., an indication of position or location that is off be a certain amount). A receiving vehicle that receives a message (e.g., an SDSM, BSM, CAM, CPM, etc.) from a transmitting vehicle can use a reputation score of that transmitting vehicle to determine whether or to what degree the receiving vehicle can trust the information in the message. For instance, in some cases, the receiving vehicle can apply weights to data from various transmitting vehicles based on reputation scores of the transmitting vehicles. The receiving device can then make a decision (e.g., whether to perform a particular maneuver, such as breaking, making a lane change, automatic breaking, automatic steering to maintain a particular heading, etc.) based on the weighted data.

In some examples, a transmitting device can assign a reputation score to itself. For instance, a transmitting device may determine its reputation score based on the type or quality of sensors the device has (e.g., high-quality radar, LIDAR, camera, GNSS, or other sensors that generate high-quality data such as RF data, image data, position data, detection data, etc., low-quality sensors that generate less accurate or more noisy data, etc.), the model of the vehicle, and/or other characteristic or feature of the vehicle. The transmitting device may advertise its reputation score along with its vehicle-based message 1015. For example, in some cases, the reputation score of a transmitting device may be embedded within the vehicle-based message 1015. In such an example, the transmitting device may advertise its reputation score by transmitting the vehicle-based message 1015. In some aspects of the system 1000, the reputation score may specifically be embedded within the HostData 1120 field of the Detected Object Data 1110a, 1110b of the vehicle-based message 1015.

In some cases, the transmitting device (e.g., an equipped network device that generates and sends the vehicle-based messages 1015) may be misbehaving (e.g., operating as a misbehaving vehicle) or may have fault or low-quality sensors. In these cases, the transmitting device may be sending (e.g., either purposely or not purposely) vehicle-based messages 1015 containing incorrect or faulty information. For example, a transmitting device may be determined to be a misbehaving vehicle if the information contained within its vehicle-based messages 1015 identifies locations for the transmitting device that are impossible (e.g., the information shows that the transmitting device is jumping from one location to another location within a short amount of time such that it is impossible for the transmitting device to move so quickly to the new location). In these cases, a receiving device (e.g., an equipped network device that receives the vehicle-based messages 1015) of vehicle-based messages 1015 from the misbehaving vehicle can send vehicle-based messages 1015 to other equipped network devices that report the misbehaving vehicle by assigning a low reputation score to the misbehaving vehicle. In some cases, the reputation score for a misbehaving vehicle may be embedded within the vehicle-based message 1015 itself. In some aspects of the system 1000, the reputation score may specifically be embedded within the MisbehavingVehicleData of the Detected Object Data 1110a, 1110b of the vehicle-based message 1015.

It should be noted that when transmitting devices (e.g., equipped network devices that generate and send the vehicle-based messages 1015) assign a reputation score for themselves, the transmitting devices may be prone to cheating regarding their reputation scores (e.g., assigning overly inflated reputation scores for themselves). In order to effectively increase the accuracy of the information exchange (e.g., in the vehicle-based messages 1015) among the equipped network devices (e.g., V2X enabled network devices), the system of the present disclosure provides several different strategies regarding the calculation and assignment of reputation scores for transmitting devices.

According to aspects described herein, one strategy for the calculation and assignment of reputation scores for transmitting devices employs a trusted central network entity to calculate and assign reputation scores for the transmitting devices. The central network entity can analyze information from vehicle-based messages 1015 that originate from a plurality of different transmitting devices to evaluate, calculate, and assign reputation scores for the transmitting devices. The communications and computation are centralized at a central network entity to provide an efficient use of bandwidth and power as well as ultra-low latency. Since the central network entity is centrally connected to the network, it will likely have a higher security level and be more difficult to compromise than just a single equipped network device, such as a vehicle. In one or more examples, a 5G multi-access edge computing (MEC) device may be employed for the central network entity. In some examples, a universal mobile telecommunications system (Uu) interface may be utilized as the air interface for transmission (e.g., of vehicle-based messages, such as SDSMs, BSMs, CAMs, CPMs, etc.) between the equipped network devices and the central network entity.

In some cases, for this strategy, the calculation and assignment of reputation scores for the transmitting devices is performed in a distributed manner via blockchain (e.g., including a plurality of equipped network devices). For example, for this strategy, equipped network devices, such as local RSUs and/or local MECs, may be alternatively and/or additionally employed to calculate and assign reputation scores for the transmitting devices. This strategy is discussed in detail in the description of FIG. 12.

Additionally or alternatively, according to aspects described herein, another strategy for the calculation and assignment of reputation scores for transmitting devices involves the receiving devices (e.g., equipped network devices that receive one or more vehicle-based messages, such as vehicle-based message 1015) calculating and assigning reputation scores for the transmitting devices of the received sensor sharing messages 1015. For this strategy, the transmitting devices are not required to send a self-reputation score along with their vehicle-based messages (e.g., with the vehicle-based message 1015). This strategy is discussed in detail in the description of FIGS. 13 and 14.

Also, another strategy for the calculation and assignment of reputation scores for transmitting devices is a hybrid strategy that combines the two previously discussed strategies, including the central network entity-assigned reputation scores and the receiving device-based reputation scores. This hybrid strategy is discussed in detail in the description of FIG. 15. In some aspects, another example of a hybrid strategy may combine self-assigned reputation scores with the central network entity-assigned reputation scores and/or the receiving device-based reputation scores. In such cases, a receiving device or network entity may identify a falsified or inconsistent reputation score that is self-assigned by a transmitting device by comparing the self-assigned reputation score with the reputation score(s) generated by a receiving-device and/or a network entity.

Figure 12:
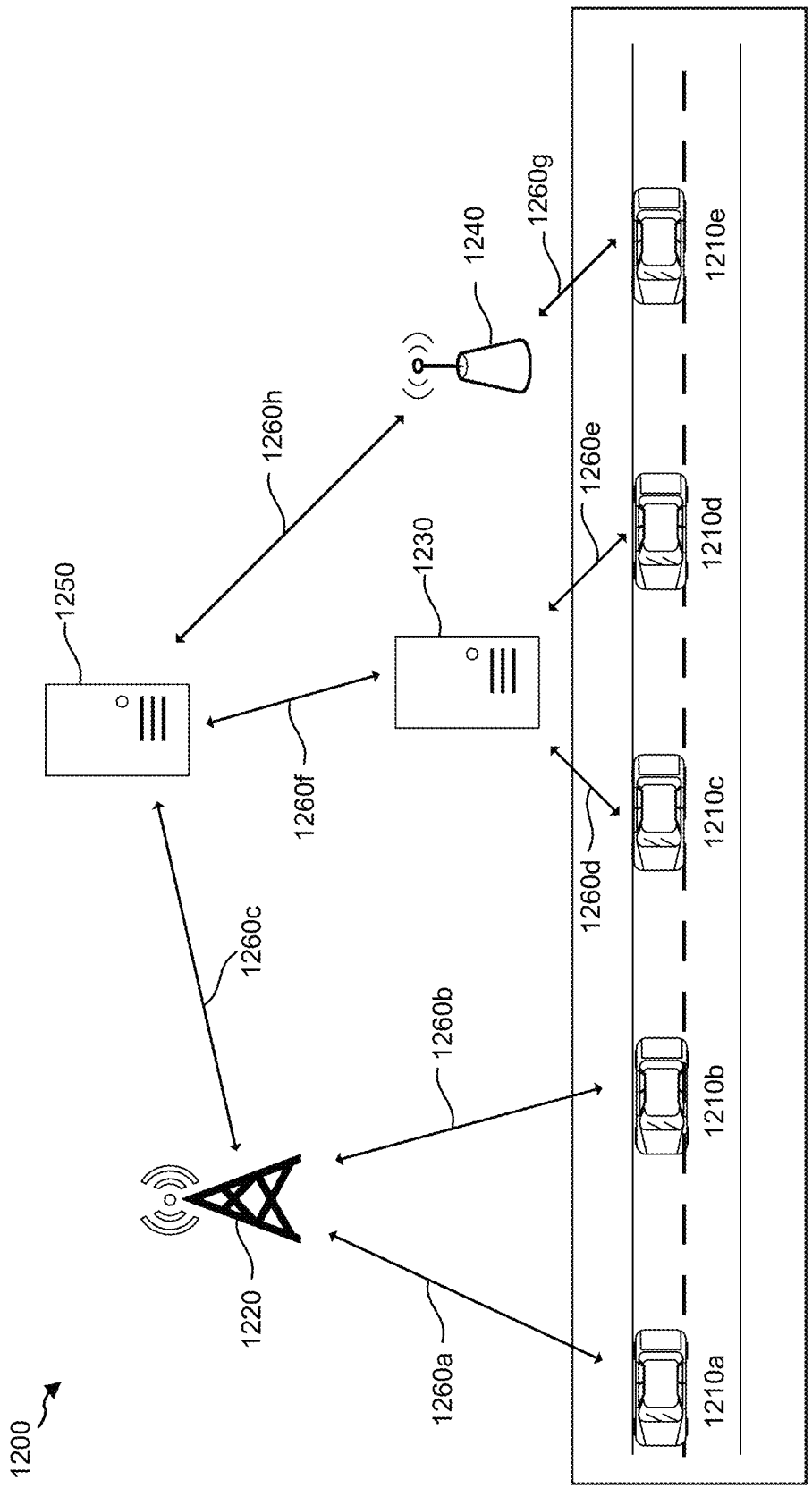
FIG. 12 is a diagram illustrating an example of a system for assigning a reputation score for communications (e.g., V2X communications), where the reputation score is assigned by a central network entity, in accordance with some aspects of the present disclosure.

FIG. 12 is a diagram illustrating an example of a system 1200 for assigning a reputation score for communications (e.g., V2X communications), where the reputation score is assigned by a central network entity 1250, in accordance with some aspects of the present disclosure. In FIG. 12, the system 1200 is shown to include a plurality of equipped (e.g., V2X capable) network devices. The plurality of equipped network devices includes vehicles (e.g., automobiles) 1210a, 1210b, 1210c, 1210d, 1210e, an RSU 1240, and a local MEC 1230. The system 1200 is also shown to include a base station (e.g., eNB or gNB) 1220, which may operate as a relay, as well as a trusted central network entity (e.g., a central MEC) 1250. The system 1200 may comprise more or less equipped network devices, than as shown in FIG. 12. The system 1200 may also comprise non-equipped network devices (e.g., non-equipped vehicles, VRUs, and pedestrians), which are not shown in FIG. 12. Also, the system 1200 may comprise more or less base stations 1220 than as shown in FIG. 12. In addition, the system 1200 may comprise more or less different types of equipped network devices (e.g., which may include equipped UEs), than as shown in FIG. 12. In addition, in one or more examples, the equipped network devices (e.g., vehicles 1210a, 1210b, 1210c, 1210d, 1210e, RSU 1240, and local MEC 1230) may be equipped with heterogeneous capability, which may include, but is not limited to, C-V2X/DSRC capability, 4G/5G cellular connectivity, GPS capability, camera capability, radar capability, and/or LIDAR capability.

The plurality of equipped network devices (e.g., vehicles 1210a, 1210b, 1210c, 1210d, 1210e, RSU 1240, and local MEC 1230) may be capable of performing V2X communications. At least some of the equipped network devices (e.g., vehicles 1210a, 1210b, 1210c, 1210d, 1210e, RSU 1240, and local MEC 1230) are capable of transmitting and receiving sensing signals for radar (e.g., RF sensing signals) and/or LIDAR (e.g., optical sensing signals) to detect nearby vehicles and/or objects. Additionally or alternatively, in some cases, at least some of the equipped network devices are configured to detect nearby vehicles and/or objects using one or more cameras (e.g., by processing images captured by the one or more cameras to detect the vehicles/objects). In one or more examples, the equipped network devices (e.g., vehicles 1210a, 1210b, 1210c, 1210d, 1210e, RSU 1240, and local MEC 1230) may be capable of transmitting and receiving sensing signals of some kind (e.g., radar and/or LIDAR sensing signals). Also, some of the equipped network devices may have higher capability sensors (e.g., GPS receiving devices, cameras, RF antennas, and/or optical lasers and/or optical sensors) than other equipped network devices of the system 1200.

The central network entity 1250 may be a 5G MEC device. In some examples, the MEC can allow for low-latency communications (e.g., V2X communications) by utilizing a Uu interface as the air interface for transmission (e.g., of vehicle-based messages for safety and non-safety applications, such as SDSMs, BSMs, CAMs, CPMs, etc.) between the equipped network devices (e.g., vehicles 1210a, 1210b, 1210c, 1210d, 1210e, RSU 1240, and local MEC 1230), the base station 1220, and the central network entity 1250. In some examples, the central network entity 1250 may be located within the cloud and/or co-located with the Home Location Register (HLR) and/or American Automobile Association (AAA) databases.

During operation of the system 1200, the equipped network devices (e.g., vehicles 1210a, 1210b, 1210c, 1210d, 1210e, RSU 1240, and local MEC 1230) may transmit and/or receive sensing signals (e.g., RF and/or optical signals) to sense and detect vehicles (e.g., vehicles 1210a, 1210b, 1210c, 1210d, 1210e) and/or objects (not shown in FIG. 12) located within and surrounding the road. The equipped network devices (e.g., vehicles 1210a, 1210b, 1210c, 1210d, 1210e, RSU 1240, and local MEC 1230) may use the sensing signals to determine characteristics (e.g., motion, dimensions, type, heading, and speed) of the detected vehicles and/or objects. The equipped network devices (e.g., vehicles 1210a, 1210b, 1210c, 1210d, 1210e, RSU 1240, and local MEC 1230) may generate at least one vehicle-based message (e.g., vehicle-based message 1015 of FIG. 11) including information related to the determined characteristics of the detected vehicles and/or objects. In some examples, the vehicle-based message 1015 may be in the form of an SDSM (e.g., an SAE J3224 SDSM), a BSM, a CAM, a CPM, and/or other format.

After the equipped network devices (e.g., vehicles 1210a, 1210b, 1210c, 1210d, 1210e, RSU 1240, and local MEC 1230) generate at least one vehicle-based message (e.g., vehicle-based message 1015), the equipped network devices (e.g., vehicles 1210a, 1210b, 1210c, 1210d, 1210e, RSU 1240, and local MEC 1230), operating as transmitting devices, may transmit vehicle-based messages 1260a, 1260b, 1260d, 1260e, 1260f, 1260g, 1260h (which may be similar to the vehicle-based message 1015) to receiving devices (e.g., local MEC 1230, RSU 1240, and central network entity 1250) that receive the vehicle-based messages. For example, in particular, equipped network devices (e.g., vehicles 1210a, 1210b) may transmit vehicle-based messages 1260a, 1260b, 1260c to the central network entity 1250 via base station 1220, which is operating as a relay.

Also, in some examples, equipped network devices (e.g., vehicles 1210c, 1210d) may transmit vehicle-based messages 1260d, 1260e, 1260f to the central network entity 1250 via the local MEC 1230, which may be operating as relay. In addition, equipped network device (e.g., vehicle 1210e) may transmit vehicle-based messages 1260g, 1260h to the central network entity 1250 via the RSU 1240, which may be operating as a relay.

In some aspects, one or more of the equipped network devices (e.g., the local MEC 1230 and/or the RSU 1240) may operate as transmitting devices (e.g., obtaining sensing data themselves with their own sensors and generating vehicle-based messages) and/or operate as relays (e.g., relaying vehicle-based messages that they receive from transmitting devices, such as vehicles, to the central network entity 1250). When the equipped network devices (e.g., the local MEC 1230 and/or the RSU 1240) are operating as relays, after the equipped network devices (e.g., the local MEC 1230 and/or the RSU 1240) receive the vehicle-based messages from transmitting devices, the equipped network devices (e.g., the local MEC 1230 and/or the RSU 1240) may embed the transmitting devices' reputation scores into the vehicle-based messages and then transmit 1260f, 1260h the relayed vehicle-based messages (e.g., embedded with the transmitting devices' reputation scores) to the central network entity (e.g., central MEC) 1250.

In addition, when the equipped network devices (e.g., the local MEC 1230 and/or the RSU 1240) are operating as transmitting devices, after the equipped network devices (e.g., the local MEC 1230 and/or the RSU 1240) generate the vehicle-based messages, the equipped network devices (e.g., the local MEC 1230 and/or the RSU 1240) may transmit 1260f, 1260h their generated vehicle-based messages to the central network entity (e.g., central MEC) 1250.

It should be noted that the equipped network devices (e.g., the local MEC 1230 and/or the RSU 1240) may connect to the central network entity 1250 via a publish and/or subscribe model. The equipped network devices (e.g., the local MEC 1230 and/or the RSU 1240) may be able to obtain a particular transmitting device's current reputation score from the central network entity 1250, and may update a transmitting vehicle's reputation score based on the locally observed behavior of that transmitting vehicle.

Upon receiving the vehicle-based messages from the transmitting devices (e.g., vehicles 1210a, 1210b, 1210c, 1210d, 1210e, RSU 1240, and local MEC 1230), the receiving devices (e.g., the local MEC 1230, RSU 1240 and central network entity 1250) may calculate, determine, and assign reputation scores to the transmitting devices (e.g., vehicles 1210a, 1210b, 1210c, 1210d, 1210e) by analyzing the information contained within the received vehicle-based messages. In some examples, the receiving devices may determine the reputation scores of the transmitting devices by authenticating the transmitting devices and/or determining that the transmitting devices that are misbehaving.

As previously mentioned, in some cases, the reputation score of a transmitting device may be embedded within a vehicle-based message itself (e.g., within vehicle-based message 1015). For example, the reputation score may specifically be embedded within the HostData of the Detected Object Data 1110a, 1110b of FIG. 11 of the vehicle-based message 1015. Alternatively or additionally, in some cases, when a receiving device determines that a transmitting device is misbehaving, the reputation score for the misbehaving transmitting device may be embedded within the MisbehavingVehicleData of the Detected Object Data 1110a, 1110b of the vehicle-based message 1015.

In one or more examples, the reputation score of a transmitting device (e.g., vehicles 1210a, 1210b, 1210c, 1210d, 1210e) can be assigned to the transmitting device's SIM profile (or a SIM profile of a user of the transmitting device). Assigning the reputation score to a SIM profile of a transmitting device or user of the transmitting device allows for the reputation score to be calculated over a long period of time as the transmitting device (e.g., equipped network device, such as a vehicle) drives through various different neighborhoods over time. In some examples, with respect to the LTE C-V2X sidelink PC5 interface, a pseudonym certificate (e.g., short term credential) may be assigned to equipped network devices (e.g., vehicles) to avoid tracking of the equipped network devices. Since the pseudonym certificates are frequently being changed for the equipped network devices, if the reputation scores are assigned to pseudonym certificates for transmitting devices (e.g., equipped network devices), the reputation scores may be lost when the pseudonym certificate are changed for the transmitting devices. As such, the assigning of reputation scores for transmitting devices to the SIM profiles of the transmitting devices (or users of the transmitting devices) allows for the association of the reputation scores to the transmitting devices for a longer period of time as compared to assigning the reputation scores for transmitting devices to the pseudonym certificates of the transmitting devices.

In one or more examples, the SIM profiles for the equipped network devices (e.g., vehicles 1210a, 1210b, 1210c, 1210d, 1210e) may be stored within the central network entity (e.g., central MEC) 1250. In other examples, the SIM profiles for the equipped network devices (e.g., vehicles 1210a, 1210b, 1210c, 1210d, 1210e) may be stored within the cloud, which the central network entity (e.g., central MEC) 1250 has access. In some examples, the central network entity (e.g., central MEC) 1250 and/or the cloud, which the central network entity (e.g., central MEC) 1250 has access, may have an interface with a security credential management system (SCMS) or other related entities by which the central network entity (e.g., central MEC) 1250 and/or the cloud can obtain a certificate revocation list (CRL) or any other misbehavior reports regarding the equipped network devices.

Figure 13:
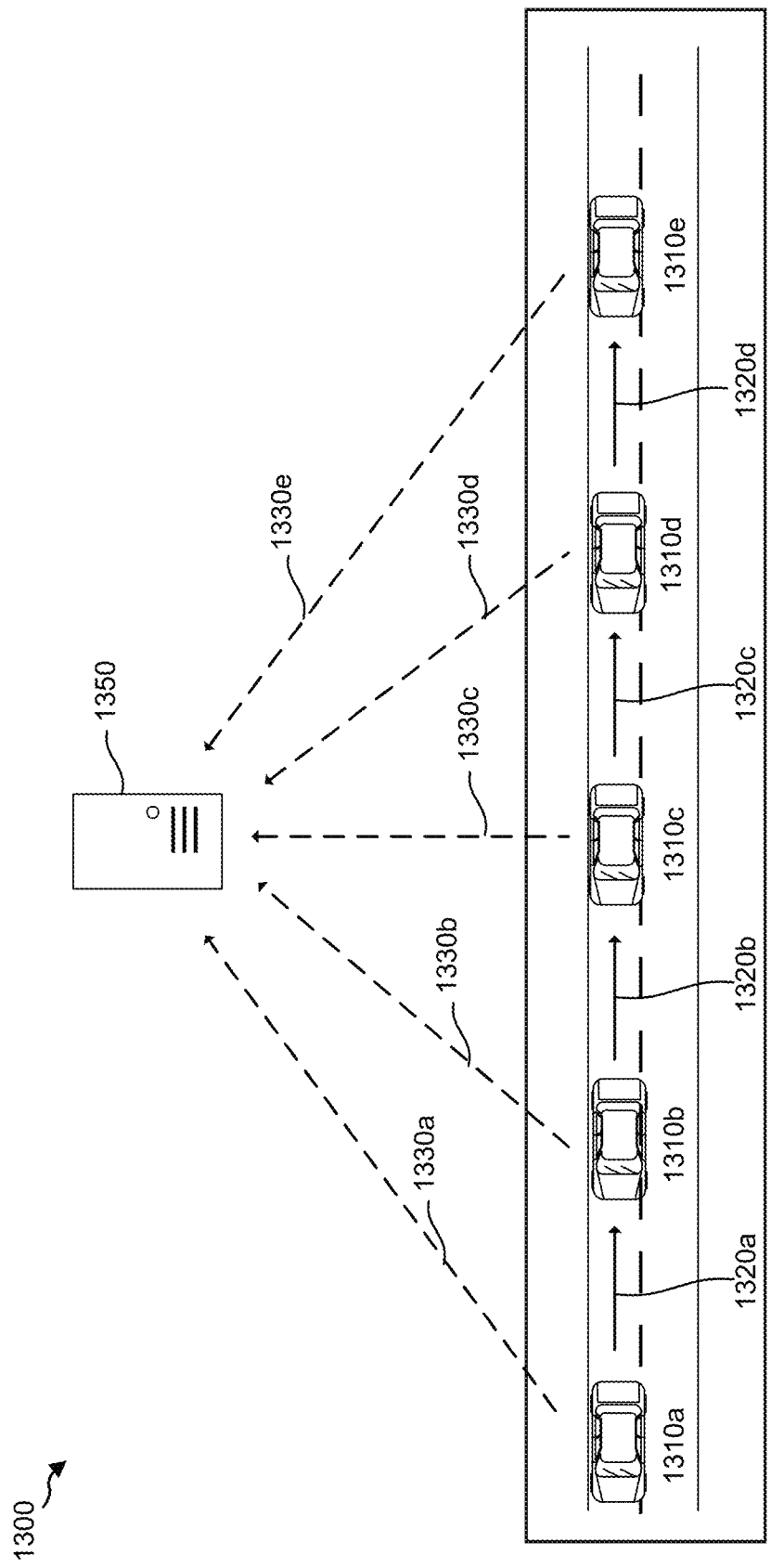
FIG. 13 is a diagram illustrating an example of a system for assigning a reputation score for communications (e.g., V2X communications), where the reputation score is assigned by a receiving device, in accordance with some aspects of the present disclosure.
Figure 14:
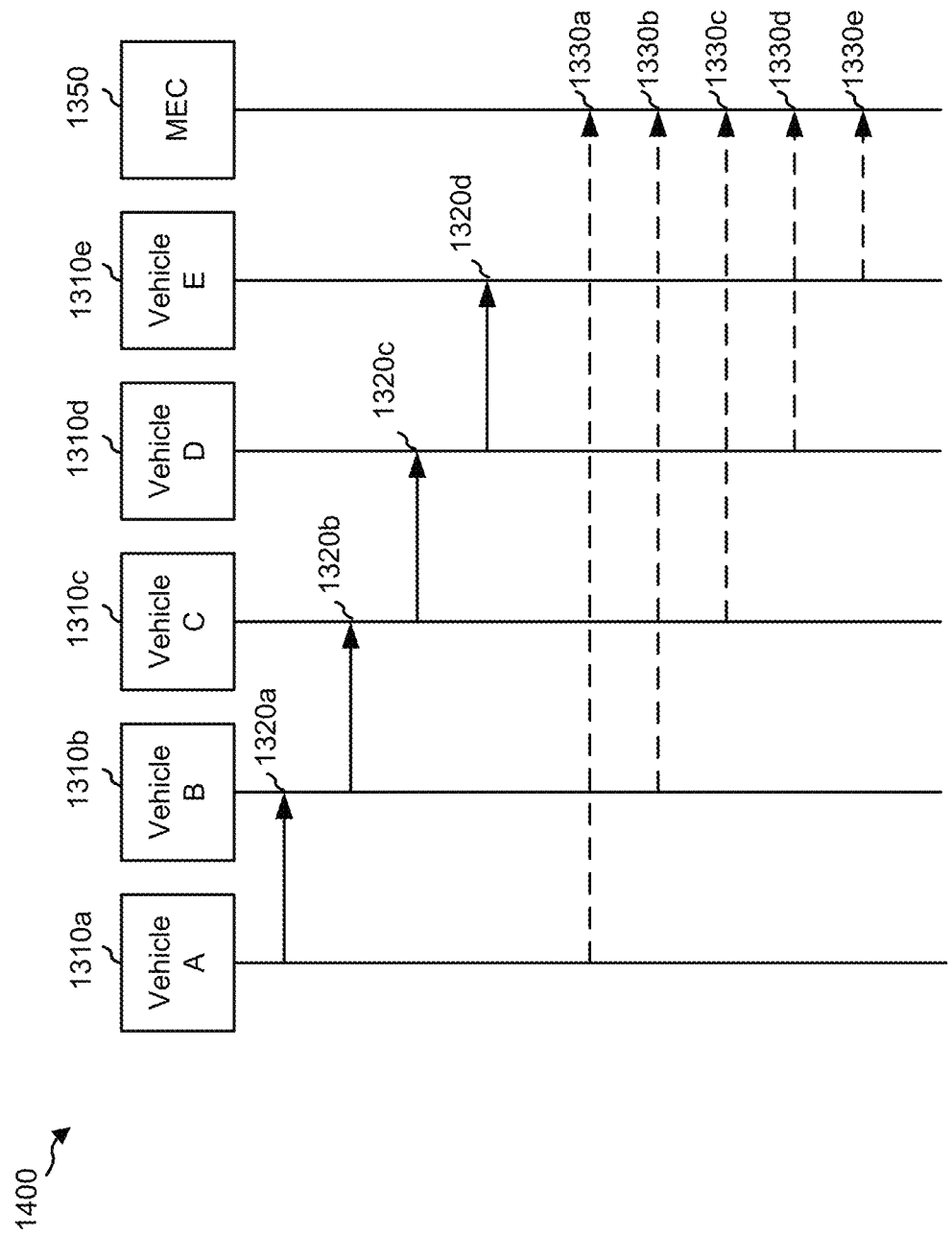
FIG. 14 is a diagram of an example of a communication (e.g., a V2X communications) exchange for the system of FIG. 13, in accordance with some aspects of the present disclosure.

FIG. 13 is a diagram illustrating an example of a system 1300 for assigning a reputation score for communications (e.g., V2X communications), where the reputation score is assigned by a receiving device (e.g., equipped network devices, such as vehicles 1310b, 1310c, 1310d, 1310e), in accordance with some aspects of the present disclosure. FIG. 14 is a diagram of an example of a communication (e.g., a V2X communications) exchange 1400 for the system of FIG. 13, in accordance with some aspects of the present disclosure.

In FIG. 13, the system 1300 is shown to include a plurality of equipped (e.g., V2X capable) network devices. The plurality of equipped network devices includes vehicles (e.g., automobiles) 1310a, 1310b, 1310c, 1310d 1310e. The system 1300 is also shown to include a trusted central network entity (e.g., a central MEC) 1350. The system 1300 may comprise more or less equipped network devices, than as shown in FIG. 13. The system 1300 may also comprise non-equipped network devices (e.g., non-equipped vehicles, VRUs, and pedestrians), which are not shown in FIG. 13. Also, the system 1300 may comprise more or less different types of equipped network devices (e.g., which may include equipped UEs, base stations, local MECs, and RSUs), than as shown in FIG. 13. In addition, in one or more examples, the equipped network devices (e.g., vehicles 1310a, 1310b, 1310c, 1310d, 1310e) may be equipped with heterogeneous capability, which may include, but is not limited to, C-V2X/ DSRC capability, 4G/5G cellular connectivity, GPS capability, camera capability, radar capability, and/or LIDAR capability.

The plurality of equipped network devices (e.g., vehicles 1310a, 1310b, 1310c, 1310d, 1310e) may be capable of performing V2X communications. At least some of the equipped network devices (e.g., vehicles 1310a, 1310b, 1310c, 1310d, 1310e) are capable of transmitting and receiving sensing signals for radar (e.g., RF sensing signals) and/or LIDAR (e.g., optical sensing signals) to detect nearby vehicles and/or objects. In one or more examples, the equipped network devices (e.g., vehicles 1310a, 1310b, 1310c, 1310d, 1310e) may be capable of transmitting and receiving sensing signals of some kind (e.g., radar and/or LIDAR sensing signals). Also, some of the equipped network devices may have higher capability sensors (e.g., GPS receivers, cameras, RF antennas, and/or optical lasers and/or optical sensors) than other equipped network devices of the system 1200.

The central network entity 1350 may be a 5G MEC device, which can allow for low-latency communications (e.g., V2X communications) by utilizing a Uu interface as the air interface for transmission (e.g., of vehicle-based message 1015 for safety and non-safety applications, such as an SDSM, BSM, CAM, CPM, etc.) between the equipped network devices (vehicles 1310a, 1310b, 1310c, 1310d, 1310e) and the central network entity 1350. In some examples, the central network entity 1350 may be located within the cloud and/or co-located with the HLR and/or AAA databases.

During operation of the system 1300, the equipped network devices (e.g., vehicles 1310a, 1310b, 1310c, 1310d, 1310e) may transmit and/or receive sensing signals (e.g., RF and/or optical signals) to sense and detect vehicles (e.g., e.g., vehicles 1310a, 1310b, 1310c, 1310d, 1310e) and/or objects (not shown in FIG. 13). The equipped network devices (e.g., vehicles 1310a, 1310b, 1310c, 1310d, 1310e) may use the sensing signals to determine characteristics (e.g., motion, dimensions, type, heading, and speed) of the detected vehicles and/or objects. The equipped network devices (e.g., vehicles 1310a, 1310b, 1310c, 1310d, 1310e) may generate at least one vehicle-based message (e.g., vehicle-based message 1015 of FIG. 11) including information related to the determined characteristics of the detected vehicles and/or objects. The vehicle-based message 1015 may be in the form of a standard BSM, a CAM, a CPM, a SDSM (e.g., SAE J3224 SDSM), and/or other format.

After the equipped network devices (e.g., vehicles 1310a, 1310b, 1310c, 1310d, 1310e) generate the vehicle-based messages 1015, a first equipped network device (e.g., Vehicle A) 1310a, operating as a transmitting device (or sender), may transmit (e.g., signal 1320a of FIGS. 13 and 14) a vehicle-based message 1015 to a second equipped network device (e.g., Vehicle B) 1310b, operating as a receiving device. In one or more examples, the first equipped network device (e.g., Vehicle A) 1310a may optionally transmit (e.g., signal 1330a of FIGS. 13 and 14) the vehicle-based message 1015 to the central network entity 1350.

After the second equipped network device (e.g., Vehicle B) 1310b receives the vehicle-based message 1015 from the first equipped network device (e.g., Vehicle A) 1310a, the second equipped network device (e.g., Vehicle B) 1310b may calculate, determine, and assign a reputation score to the first equipped network device (e.g., Vehicle A) 1310a by analyzing the information contained within the received vehicle-based message 1015.

After the second equipped network device (e.g., Vehicle B) 1310*b* assigns a reputation score to the first equipped network device (e.g., Vehicle A) 1310*a*, which is operating as the transmitting device, the second equipped network device (e.g., Vehicle B) 1310*b* may embed the reputation score for the first equipped network device (e.g., Vehicle A) 1310*a* into the vehicle-based message 1015 and may transmit (e.g., signal 1320*b* of FIGS. 13 and 14) the vehicle-based message 1015 containing the reputation score for the first equipped network device (e.g., Vehicle A) 1310*a* to a third equipped network device (e.g., Vehicle C) 1310C. In one or more examples, the second equipped network device (e.g., Vehicle B) 1310*b* may optionally transmit (e.g., signal 1330*b* of FIGS. 13 and 14) the vehicle-based message 1015 to the central network entity 1350.

After the third equipped network device (e.g., Vehicle C) 1310*c* receives the vehicle-based message 1015 from the second equipped network device (e.g., Vehicle B) 1310*b*, the third equipped network device (e.g., Vehicle C) 1310*c* may calculate, determine, and assign a reputation score to the first equipped network device (e.g., Vehicle A) 1310*a* and/or the second equipped network device (e.g., Vehicle B) 1310*b* by analyzing the information contained within the received vehicle-based message 1015.

After the third equipped network device (e.g., Vehicle C) 1310*c* assigns a reputation score to the first equipped network device (e.g., Vehicle A) 1310*a* and/or the second equipped network device (e.g., Vehicle B) 1310*b*, the third equipped network device (e.g., Vehicle C) 1310*c* may embed the reputation score for the first equipped network device (e.g., Vehicle A) 1310*a* and/or the second equipped network device (e.g., Vehicle B) 1310*b* into the vehicle-based message 1015 and may transmit (e.g., signal 1320*c* of FIGS. 13 and 14) the vehicle-based message 1015 containing the reputation score for the first equipped network device (e.g., Vehicle A) 1310*a* and/or the second equipped network device (e.g., Vehicle B) 1310*b* to a fourth equipped network device (e.g., Vehicle D) 1310*d*. In one or more examples, the third equipped network device (e.g., Vehicle C) 1310*c* may optionally transmit (e.g., signal 1330*c* of FIGS. 13 and 14) the vehicle-based message 1015 to the central network entity 1350.

After the fourth equipped network device (e.g., Vehicle D) 1310*d* receives the vehicle-based message 1015 from the third equipped network device (e.g., Vehicle C) 1310*c*, the fourth equipped network device (e.g., Vehicle D) 1310*d* may calculate, determine, and assign a reputation score to the first equipped network device (e.g., Vehicle A) 1310*a*, the second equipped network device (e.g., Vehicle B) 1310*b*, and/or the third equipped network device (e.g., Vehicle C) 1310*c* by analyzing the information contained within the received vehicle-based message 1015.

After the fourth equipped network device (e.g., Vehicle D) 1310*d* assigns a reputation score to the first equipped network device (e.g., Vehicle A) 1310*a*, the second equipped network device (e.g., Vehicle B) 1310*b* and/or the third equipped network device (e.g., Vehicle C) 1310*c*, the fourth equipped network device (e.g., Vehicle D) 1310*d* may embed the reputation score for the first equipped network device (e.g., Vehicle A) 1310*a*, the second equipped network device (e.g., Vehicle B) 1310*b*, and/or the third equipped network device (e.g., Vehicle C) 1310*c* into the vehicle-based message 1015 and may transmit (e.g., signal 1320*d* of FIGS. 13 and 14) the vehicle-based message 1015 containing the reputation score for the first equipped network device (e.g., Vehicle A) 1310*a*, the second equipped network device (e.g., Vehicle B) 1310*b*, and/or the third equipped network device (e.g., Vehicle C) 1310*c* to a fifth equipped network device (e.g., Vehicle E) 1310*e*. In one or more examples, the fourth equipped network device (e.g., Vehicle D) 1310*d* may optionally transmit (e.g., signal 1330*d* of FIGS. 13 and 14) the vehicle-based message 1015 to the central network entity 1350.

After the fifth equipped network device (e.g., Vehicle E) 1310*e* receives the vehicle-based message 1015 from the fourth equipped network device (e.g., Vehicle D) 1310*d*, the fifth equipped network device (e.g., Vehicle E) 1310*e* may calculate, determine, and assign a reputation score to the first equipped network device (e.g., Vehicle A) 1310*a*, the second equipped network device (e.g., Vehicle B) 1310*b*, the third equipped network device (e.g., Vehicle C) 1310*c*, and/or the fourth equipped network device (e.g., Vehicle D) 1310*d* by analyzing the information contained within the received vehicle-based message 1015.

After the fifth equipped network device (e.g., Vehicle E) 1310*e* assigns a reputation score to the first equipped network device (e.g., Vehicle A) 1310*a*, the second equipped network device (e.g., Vehicle B) 1310*b*, the third equipped network device (e.g., Vehicle C) 1310*c*, and/or the fourth equipped network device (e.g., Vehicle D) 1310*d*, the fifth equipped network device (e.g., Vehicle E) 1310*e* may embed the reputation score for the first equipped network device (e.g., Vehicle A) 1310*a*, the second equipped network device (e.g., Vehicle B) 1310*b*, the third equipped network device (e.g., Vehicle C) 1310*c*, and/or the fourth equipped network device (e.g., Vehicle D) 1310*d* into the vehicle-based message 1015 and may optionally transmit (e.g., signal 1330*e* of FIGS. 13 and 14) the vehicle-based message 1015 containing the reputation score for the first equipped network device (e.g., Vehicle A) 1310*a*, the second equipped network device (e.g., Vehicle B) 1310*b*, the third equipped network device (e.g., Vehicle C) 1310*c*, and/or the fourth equipped network device (e.g., Vehicle D) 1310*d* to the central network entity 1350.

In one or more examples, the reputation score may be chosen to be a value within the range of zero (0) to one (1), such as 0.6. In some examples, the receiving device (e.g., second equipped network vehicle 1310*b*) may assign a reputation score per transmitting device ID (e.g., tempID). In one or more examples, the transmitting device ID indicates the identity of the transmitting device (e.g., the first equipped network vehicle 1310*a*) of the vehicle-based message 1015. The transmitting device ID may be located within the receiving device's dynamic neighbor list, which may include a listing of all of the vehicles and/or objects that are located within a specific predetermined distance (or radius of distance) away from the receiving device. It should be noted that if the receiving device is able to link equipped network devices (e.g., vehicles) across transmitting device ID changes over time, then the reputation score of the transmitting device (e.g., transmitting vehicle) can be maintained over a longer duration of time. Being able to maintain the reputation score of vehicles over a long duration of time allows for more reliable reputation scores and a lesser need to maintain a larger set of reputation scores for the vehicles.

In some examples, for each transmitting device ID, the receiving device may initially establish a baseline reputation score, which is a reputation score for the first received vehicle-based message from the transmitting device. For example, the second equipped network device (e.g., Vehicle B) 1310*b*, operating as a receiving device, may establish a baseline reputation score based on a first vehicle-based message 1015 received from the first equipped network device (e.g., Vehicle A) 1310*a*, operating as a transmitting device. The receiving device can then update the reputation score for the transmitting device based on a sequence of vehicle-based messages that the receiving device receives from that particular transmitting device over time. For example, the second equipped network device (e.g., Vehicle B) 1310*b*, operating as a receiving device, may update the reputation score of the first equipped network device (e.g., Vehicle A) 1310*a*, operating as a transmitting device, based on a sequence of vehicle-based messages 1015 that the second equipped network device (e.g., Vehicle B) 1310*b* receives from the first equipped network device (e.g., Vehicle A) 1310*a* over time.

The receiving device may continue to update the reputation score of the transmitting device under the transmitting device ID until the transmitting device ID changes for the transmitting device and the receiving device is not able to link a new transmitting device ID to that particular transmitting device. In some examples, some types of vehicle-based messages (e.g., SDSM, BSM, CAM, CPM, etc.) may include additional vehicle-specific information (e.g., BSM Part II messages may include VehicleSafetyExtensions, SpecialVehicleExtensions, and/or SupplementalVehicleExtensions). This additional vehicle-specific information may enable for a longer-term association of the reputation score to the transmitting device by allowing for the receiving device to be able to identify that particular transmitting device over ID changes (e.g., TempID changes).

In one or more examples, a receiving device (e.g., a receiving vehicle) may use a variety of factors to determine a reputation score for a transmitting device (e.g., a transmitting vehicle). In some examples, these factors may include, but are not limited to, predictors, misbehavior detectors, the physical behavior of the transmitting device, any combination thereof, and/or other factors.

In some examples, the predictors may be related to at least one prediction related to characteristics of the transmitting device. For example, predictions relating to the characteristics of the transmitting device may include, but are not limited to, a prediction regarding a location of the transmitting device, a speed of the transmitting device, a heading of the transmitting device, and/or a motion of the transmitting device. The receiving device can compare one or more predictors to information in one or more received messages to determine the reputation score for each message or for the transmitting device.

When the predictions of the characteristics of the transmitting device deviate from the actual characteristics of the transmitting device more than a predetermined threshold amount (e.g., a threshold amount of distance and/or by a threshold amount of speed), the reputation score of the transmitting device will be negatively affected (e.g., by reducing the reputation score of the particular message or of the transmitting device). For example, if the received message information elements (IEs) at time "t+1" do not match (e.g., deviate greater than the predetermined threshold amounts) the predicted values made at time "t", the reputation score of the transmitting device will be negatively affected (e.g., reduced). In another example, when the predictions of the characteristics of the transmitting device deviate from the actual characteristics of the transmitting device less than the predetermined threshold amount (e.g., a threshold amount of distance and/or by a threshold amount of speed), the reputation score of the transmitting device will be positively affected (e.g., by increasing the reputation score of the particular message or of the transmitting device). For example, if the received message information IEs at time "t+1" match (e.g., deviate less than the predetermined threshold amounts) the predicted values made at time "t", the reputation score of the transmitting device will be positively affected (e.g., increased).

In one or more examples, the misbehavior detectors may be related to the plausibility and consistency of the data relating to the transmitting device. For example, the transmitting device is considered to be misbehaving (e.g., a misbehavior detector is triggered) if the information contained within the vehicle-based message from the transmitting device (e.g., regarding the transmitting device's location and/or speed) appears to be inconsistent or impossible to be true. For example, a transmitting device may be considered to be misbehaving if the information regarding the transmitting device's location and/or speed is impossible (e.g., the information shows that the transmitting device is jumping from one location to another location within a short amount of time such that it is impossible for the transmitting device to move so quickly to the new location, and/or the information shows that the transmitting device is traveling at an extreme excessive speed that is not possible for the vehicle's driving capability). In one or more examples, the receiving device can calculate how many misbehavior detectors are triggered for a vehicle-based message received from a transmitting device at time "t+1". The more misbehavior detectors that are triggered, the more the reputation score of the transmitting device will be affected negatively.

In one or more examples, the physical behavior of the transmitting device may be related to a correlation between the actual physical behavior of the transmitting device and the information (contents) of the vehicle-based message relating to the physical behavior of the transmitting device. In particular, the receiving device may correlate the actual physical behavior of the transmitting device with the information of the vehicle-based message relating to the physical behavior of the transmitting device to determine whether the reputation score of the transmitting device should be positively or negatively affected. For example, for vehicle-based messages that are application layer basic safety message (e.g., BSMs and CAMs), the receiving device may compare the data embedded within the vehicle-based message (e.g., the location and speed) with the physical traits of the received over-the-air (OTA) signal, such as the Doppler spread, angle of arrival (AoA), received signal strength indicator (RSSI), and reference signal received power (RSRP).

It should be noted that it can difficult for the receiving device to assess the trustworthiness of a vehicle-based message that reports on a non-equipped (e.g., not V2X capable) network device (e.g., vehicle) that is not located within the receiving device's line of sight (LOS). For these cases, the receiving device may need to rely on secondary effects of the non-equipped network device (e.g., vehicle) on its following of other equipped (e.g., V2X capable) network devices (e.g., vehicles). For example, if a non-equipped network device is being reported to be abruptly decelerating, but that physical behavior is not corroborated by incoming data from the equipped network devices following the non-equipped network device, then the receiving device may determine to negatively affect the reputation score of the original transmitting device of the vehicle-based message reporting on the non-equipped network device.

In one or more examples, the receiving device may employ a plurality of different calculation schemes to calculate the reputation score for a transmitting device. Types of calculation schemes that the receiving device may employ may include, but are not limited to, an averaging scheme and a Markov-based scheme (e.g., utilizing a Markov-based additive increase-multiplicative decrease technique).

For the averaging scheme for the calculation of a reputation score for a transmitting device, the receiving device may average individually calculated reputation scores of all of the received vehicle-based messages from a particular transmitting device to obtain the reputation score for that particular transmitting device. In one or more examples, the receiving device may assign equal weights (or, alternatively, decaying weights) to the vehicle-based messages. For example, when the receiving device assigns decaying weights to the vehicle-based messages, the older vehicle-based messages have less weight than the more recent vehicle-based messages.

In one or more examples, for the averaging scheme, the central network entity (e.g., central MEC) or the receiving device (e.g., equipped network device, such as a vehicle) may assign a reputation score to a transmitting device such that:

$$R = \Sigma w_i \alpha_i,$$

where $0 \leq \alpha_i \leq 1$ can be assigned based on factors (e.g., predictors, misbehavior detectors, and the physical behavior of the transmitting device), $w_i$ is the weight associated with a given message, and i refers to the history message index from that transmitting device. As such, $w_i$ can be tuned accordingly based on the weight of the historical message on the current reputation score of the transmitting device. This tuning can be based on the transmitting device type (e.g., vehicle, RSU, or local MEC) and/or message type (e.g., BSM or CAM), or based on the receiving device operating conditions (e.g., the processing and/or thermal constraints of the receiving device).

For the Markov-based scheme for the calculation of a reputation score for a transmitting device, the reputation score of a transmitting device at instance "t+1" may only depend upon the reputation score of the transmitting device at time "t". In one or more examples, for the Markov-based scheme, the receiving device may employ an additive increase-multiplicative decrease technique to the reputation score of the transmitting device. For the additive increase-multiplicative decrease technique, the reputation increasing factors can have an additive contribution to the reputation score of the transmitting device, and the reputation decreasing factors can have a multiplicative contribution to the reputation score of the transmitting device.

Figure 15:
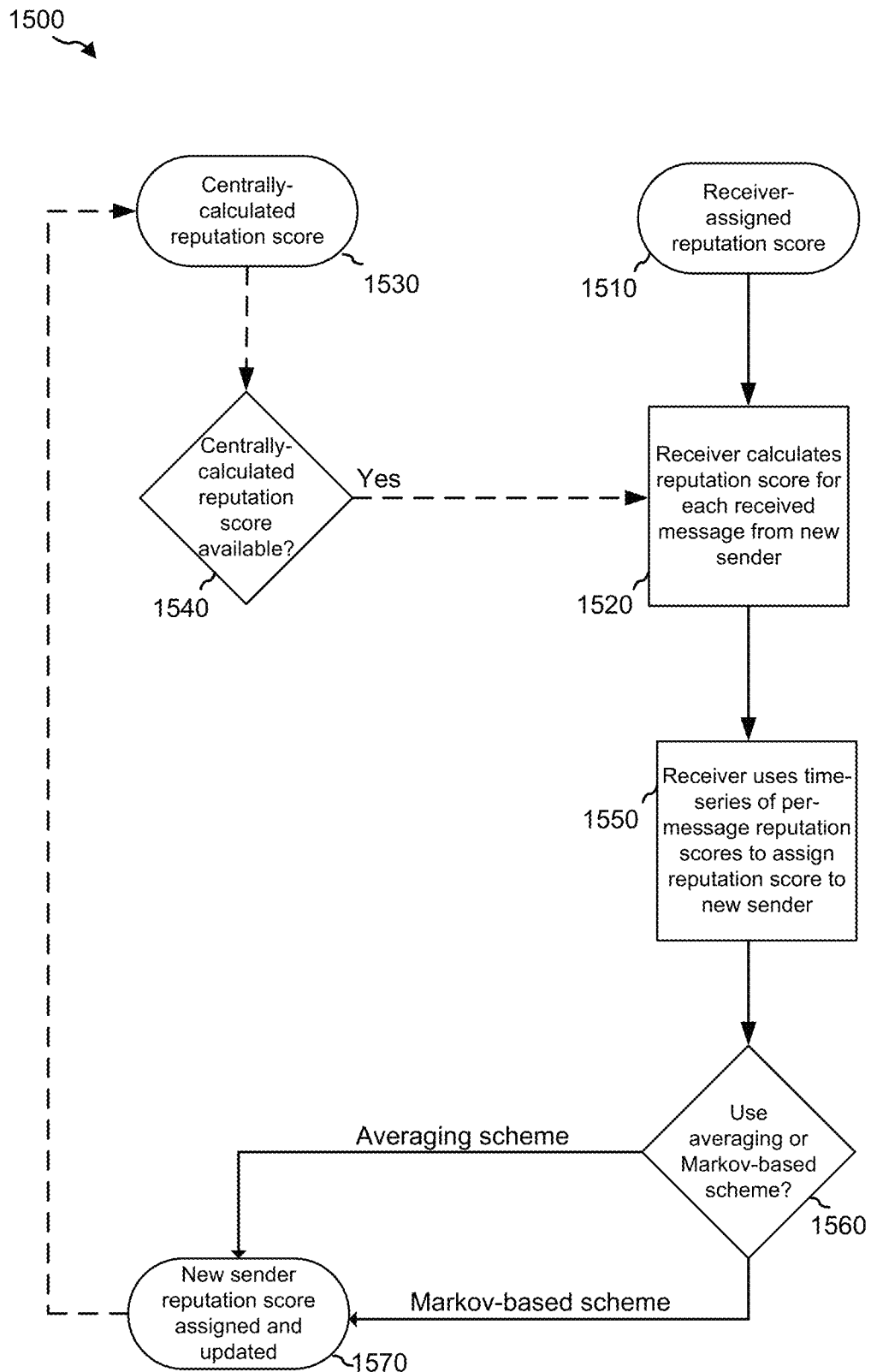
FIG. 15 is a flow diagram illustrating an example of a process for assigning a reputation score for communications (e.g., V2X communications), in accordance with some aspects of the present disclosure.

FIG. 15 is a flow diagram illustrating an example of a process 1500 for assigning a reputation score for communications (e.g., V2X communications), in accordance with some aspects of the present disclosure. The process 1500 comprises a hybrid of a centrally-calculated reputation score scheme, which begins at block 1530, and a receiving device-assigned reputation score scheme, which begins at block 1510.

For the centrally-calculated reputation score scheme, at block 1540, it is determined whether a centrally-calculated (e.g., calculated by a central network entity, such as a central MEC) reputation score for a transmitting device is available, such as over a Uu interface, a PC5 interface, a DSRC interface, or other interface. For instance, the Uu interface may be used by the central network entity to transmit a message including a reputation score to one or more receiving devices. In another example, a PC5 or DSRC interface may be used, such as in the case when an RSU advertises a Wireless Access in Vehicular Environments (WAVE) Service Advertisement (WSA) message announcing that reputation scores calculated by the RSU, infrastructure, or other entity are available on a specific channel. If a centrally-calculated reputation score for a transmitting device is available (e.g., over a Uu interface, a PC5 interface, DSRC interface, etc.), the centrally-calculated reputation score is input into block 1520 of the receiving device-assigned reputation score scheme.

For the receiving device-assigned reputation score scheme, at block 1520, a receiving device (e.g., an equipped network device, such as a vehicle) calculates a reputation score for each received message from a new transmitting device (e.g., an equipped network device, such as a vehicle). In some examples, the receiving device may calculate the reputation score using the centrally-calculated reputation score from block 1540, if available. For instance, the receiving device can augment the reputation score value it determined with the centrally-calculated reputation score received from the central network entity. For instance, for a certain number of messages where the receiving device may not yet be able to assign a reliable reputation score to a transmitting device, the receiving device can augment its determine reputation score value for the transmitting device with a reputation score determined by the central network entity.

At block 1550, the receiving device may use time-series of per-message reputation scores to assign reputation scores to the new transmitting device. At block 1560, it is determined whether the receiving device will employ an averaging scheme or a Markov-based scheme to calculate the reputation score of the new transmitting device. At block 1570, new transmitting device reputation score is assigned and updated according to the averaging scheme or a Markov-based scheme. The new transmitting device reputation score is then forwarded to the centrally-calculated reputation score scheme, at block 1530, for updating. For example, the receiving device-assigned reputation scores can be sent to the central network entity to help with the centrally-computed reputation score.

In some cases, as described above, an additional hybrid strategy for determining reputation scores may include a combination of self-assigned reputation scores with network entity-assigned reputation scores and/or the receiving device-based reputation scores. Such a strategy can avoid the problem noted above of self-assigned reputation scores being falsified. For example, a transmitting device may self-assign its own reputation score. The transmitting device may then transmit a message (e.g., an SDSM, BSM, etc.) to a receiving device and/or to a network entity. The receiving device and/or to a network entity may also determine a reputation score for the transmitting device. The receiving device and/or to a network entity may determine that the reputation score of the transmitting device is false or incorrect by comparing the self-assigned reputation score with the reputation score(s) generated by a receiving-device and/or a network entity. In some cases, the receiving device and/or to a network entity may then lower the reputation score of the transmitting device based on determining that the reputation score of the transmitting device is false or incorrect.

Figure 16:
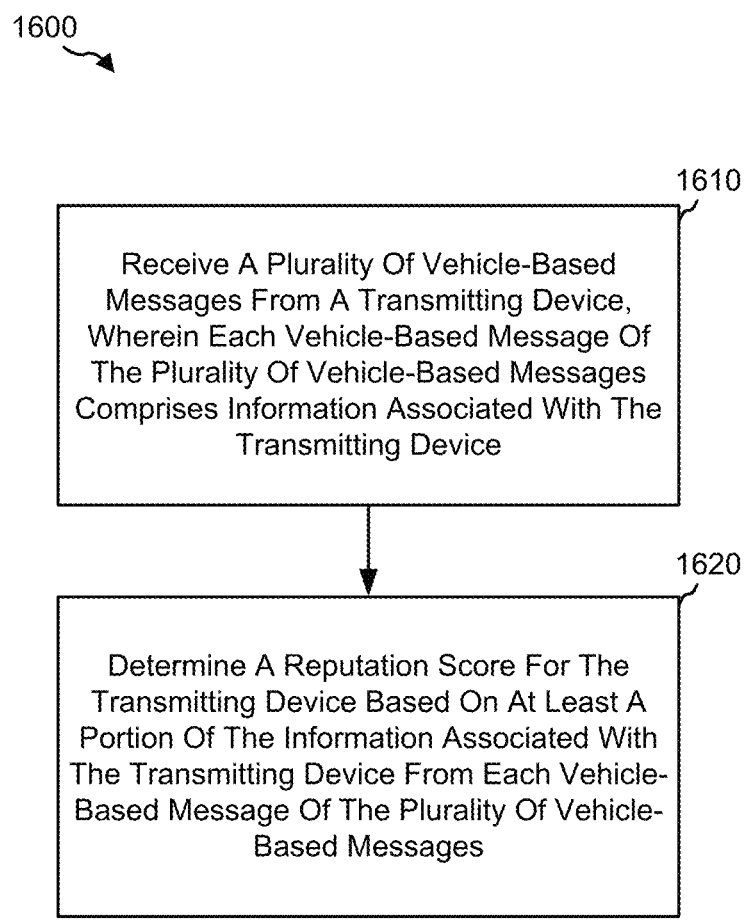
FIG. 16 is a flow diagram illustrating another example of a process for assigning a reputation score for communications (e.g., V2X communications), in accordance with some aspects of the present disclosure.

FIG. 16 is a flow diagram illustrating an example of a process 1600 for wireless communications. The process 1600 can be performed by a receiving device (e.g., a vehicle, a roadside unit (RSU), a user equipment (UE), or a central network entity such as a MEC, an eNB, a gNB, a location server such as an LMF, or a portion thereof, such as one or more of a CU, a DU, a RU, a Near-RT RIC, or a Non-RT RIC) or by a component or system (e.g., a chipset) of the receiving device. The receiving device can implement the process 1600 to assign one or more reputation score for one or more transmitting devices and/or of the receiving device itself, according to aspects described herein. The operations of the process 1600 may be implemented as software components that are executed and run on one or more controllers or processors (e.g., the control system 552 of FIG. 5, the processor 684 of FIG. 6, cellular baseband processor 1704, or other controller(s) or processor(s)). Further, the transmission and reception of signals by the network entity in the process 1600 may be enabled, for example, by one or more antennas and/or one or more transceivers (e.g., wireless transceiver(s) of the communications system 558 of FIG. 5, wireless transceiver(s) of the user device computing system 670 of FIG. 6, cellular RF transceiver of FIG. 17, etc.).

At block 1610, the receiving device (or component thereof) may receive a plurality of vehicle-based messages from a transmitting device, wherein each vehicle-based message of the plurality of vehicle-based messages comprises information associated with the transmitting device. For instance, the information associated with the transmitting device may include a location of the transmitting device, a speed of the transmitting device, a heading of the transmitting device, a motion of the transmitting device, any combination thereof, and/or other information.

At block 1610, the receiving device (or component thereof) may determine a reputation score for the transmitting device based on at least a portion of the information associated with the transmitting device from each vehicle-based message of the plurality of vehicle-based messages. In some aspects, the receiving device (or component thereof) may determine a respective reputation score for each vehicle-based message of the plurality of vehicle-based messages based on at least the portion of the information associated with the transmitting device from each vehicle-based message of the plurality of vehicle-based messages. The receiving device (or component thereof) may then determine the reputation score for the transmitting device based on the respective reputation score determined for each vehicle-based message of the plurality of vehicle-based messages. In some cases, the receiving device (or component thereof) may determine the reputation score for the transmitting device based on an average of the respective reputation score determined for each vehicle-based message of the plurality of vehicle-based messages. As noted herein, the average may include a weighted average applying a respective weight to each vehicle-based message of the plurality of vehicle-based messages. In some cases, the receiving device (or component thereof) may determine the reputation score for the transmitting device based on a Markov-based additive increase-multiplicative decrease technique.

In some examples, the receiving device (or component thereof) may determine the reputation score for the transmitting device based on comparing the information associated with the transmitting device with at least one of a predictor, a misbehavior detector, or a physical behavior of the transmitting device. For instance, as described above, a predictor may be related to at least one prediction of one or more characteristics of the transmitting device. In one example, a prediction related to one or more characteristic of the transmitting device may include a prediction of a location of the transmitting device, a speed of the transmitting device, a heading of the transmitting device, and/or a motion of the transmitting device. The receiving device can compare one or more predictors to information in one or more received messages to determine the reputation score for each message or for the transmitting device. In the event a prediction of one or more characteristics of the transmitting device deviates from the actual characteristics of the transmitting device more than a predetermined threshold amount (e.g., a threshold amount of distance and/or by a threshold amount of speed), the reputation score of the transmitting device will be negatively affected (e.g., by reducing the reputation score of the particular message or of the transmitting device).

As further described above, the misbehavior detectors may be related to the plausibility and consistency of the data relating to the transmitting device. For instance, the transmitting device may be considered to be misbehaving (e.g., a misbehaving detector is triggered) if the information contained within the vehicle-based message from the transmitting device (e.g., regarding the transmitting device's location and/or speed) appears to be inconsistent or impossible to be true. The physical behavior of the transmitting device may be related to a correlation between the actual physical behavior of the transmitting device and the information (contents) of the vehicle-based message relating to the physical behavior of the transmitting device. For instance, the receiving device may correlate the actual physical behavior of the transmitting device with the information of the vehicle-based message relating to the physical behavior of the transmitting device to determine whether the reputation score of the transmitting device should be positively or negatively affected.

As noted above, in some cases, the receiving device may be a central network entity. The central network entity is one of a multi-access edge computing (MEC) device, a base station, or a portion of a base station (e.g., one or more of a CU, a DU, a RU, a Near-RT RIC, or a Non-RT RIC). In such cases, the transmitting device may be a vehicle, a roadside unit (RSU), or user equipment (UE). In such cases, the central network entity may determine a respective reputation score for each transmitting device of a plurality of transmitting devices. The central network entity may transmit each respective reputation score to each transmitting device of the plurality of transmitting devices.

As further noted above, in some cases, the receiving device may be a first vehicle, a first roadside unit (RSU), or a first user equipment (UE). In such cases, the transmitting device may be a second vehicle, a second RSU, or a second UE. In such cases, the receiving device may receive, from a central network entity, at least one reputation score for the transmitting device. The receiving device may then determine the reputation score for the transmitting device based on the at least one reputation score for the transmitting device received from the central network entity. In some cases, the receiving device can receive a reputation score for itself from the central network entity. In other cases, the receiving device may determine a reputation score for itself.

Figure 17:
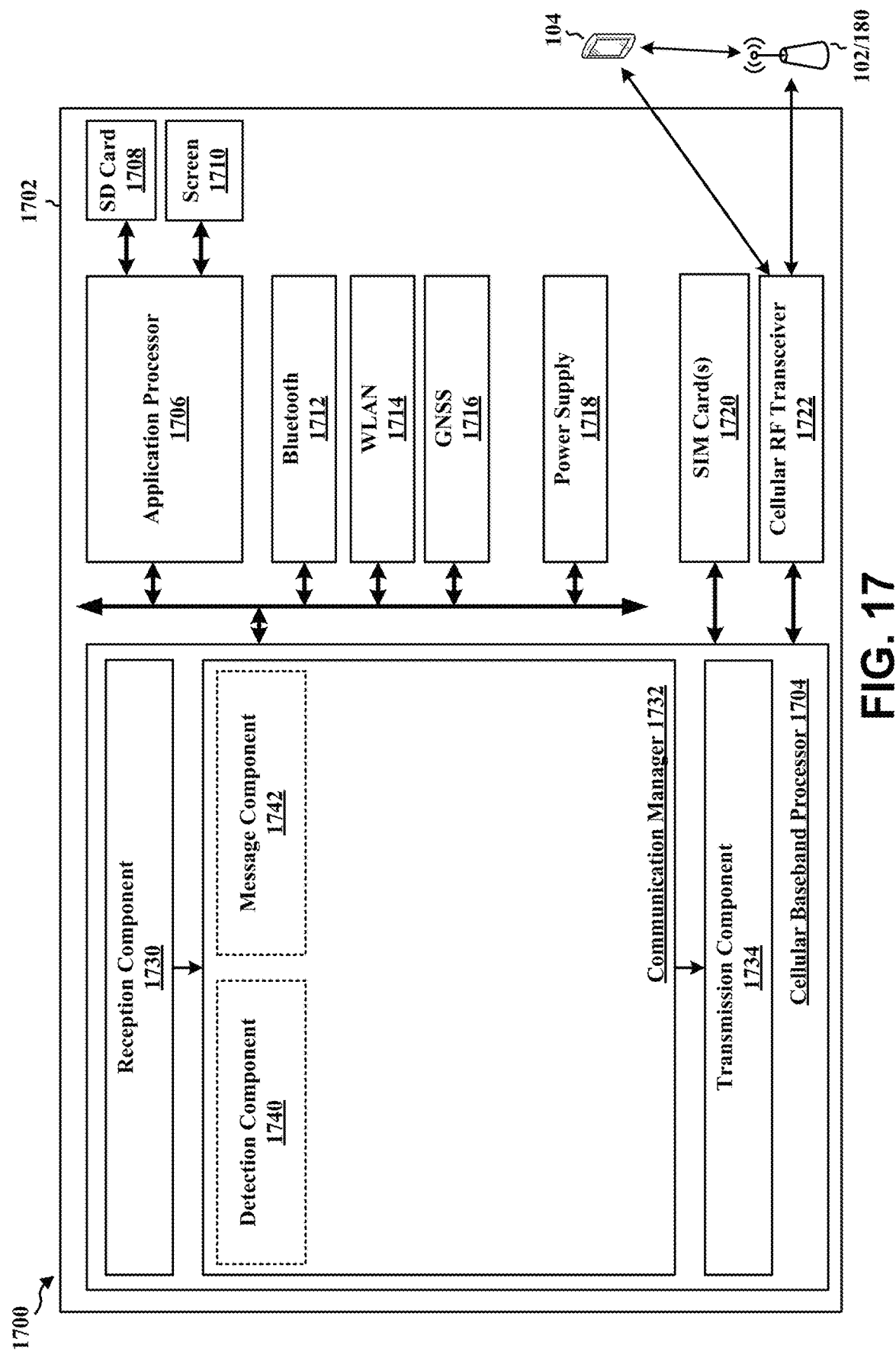
FIG. 17 is a diagram illustrating an example of a hardware implementation for an example apparatus, in accordance with some aspects of the present disclosure.

FIG. 17 is a diagram 1700 illustrating an example of a hardware implementation for an apparatus 1702. The apparatus 1702 is a UE and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a GNSS module 1716, and a power supply 1718. The GNSS module 1716 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 1704 communicates through the cellular RF transceiver 1722 with the UE 104 of FIG. 1 and/or BS 102/180 of FIG. 1. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components, including a detection component 1740 configured to detect one or more objects and a message component 1742 configured to generate one or more messages (e.g., SDSMs, CPMs, BSMs, etc.). The components within the communication manager 1732 may be stored in the computer-readable medium/memory and/or configured as hardware within the cellular baseband processor 1704. The cellular baseband processor 1704 may be a component of the device 350 of FIG. 3A and may include the memory 360 of FIG. 3A and/or at least one of the TX processor 368 of FIG. 3A, the RX processor 356 of FIG. 3A, and the controller/processor 359 of FIG. 3A. In one configuration, the apparatus 1702 may be a modem chip and include just the baseband processor 1704, and in another configuration, the apparatus 1702 may be the entire UE (e.g., see 350 of FIG. 3A) and include the aforementioned additional modules of the apparatus 1702.

The apparatus may include additional components that perform each of the blocks of the algorithm in the aforementioned flowcharts of FIGS. 15 and/or 16. As such, each block in the aforementioned flowcharts of FIGS. 15 and/or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the cellular baseband processor 1704, includes means for receiving a plurality of vehicle-based messages from a transmitting device, where each vehicle-based message of the plurality of vehicle-based messages comprises information associated with the transmitting device. The apparatus further includes means for determining a reputation score for the transmitting device based on at least a portion of the information associated with the transmitting device from each vehicle-based message of the plurality of vehicle-based message. The apparatus may further includes means for determining a respective reputation score for each transmitting device of a plurality of transmitting devices. The apparatus may further includes means for transmitting each respective reputation score to each transmitting device of the plurality of transmitting devices. The apparatus may further includes means for receiving at least one reputation score for the transmitting device and means for determining the reputation score for the transmitting device based on the at least one reputation score for the transmitting device received from the central network entity. The apparatus may further includes means for receiving, from a central network entity, a reputation score for the receiving device. The apparatus may further includes means for determining a reputation score for the receiving device. The aforementioned means may be one or more of the aforementioned components of the apparatus 1702 configured to perform the functions recited by the aforementioned means.

Specific details are provided in the description above to provide a thorough understanding of the aspects and examples provided herein, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual examples may be described above as a process or method that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data that cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. In some examples, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein can also be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A method for wireless communications at a receiving device, the method comprising: receiving, at the receiving device, a plurality of vehicle-based messages from a transmitting device, wherein each vehicle-based message of the plurality of vehicle-based messages comprises information associated with the transmitting device; and determining, at the receiving device, a reputation score for the transmitting device based on at least a portion of the information associated with the transmitting device from each vehicle-based message of the plurality of vehicle-based messages.

Aspect 2: The method of Aspect 1, wherein determining the reputation score for the transmitting device comprises: determining, at the receiving device, a respective reputation score for each vehicle-based message of the plurality of vehicle-based messages based on at least the portion of the information associated with the transmitting device from each vehicle-based message of the plurality of vehicle-based messages; and determining, at the receiving device, the reputation score for the transmitting device based on the respective reputation score determined for each vehicle-based message of the plurality of vehicle-based messages.

Aspect 3: The method of Aspect 2, wherein the reputation score for the transmitting device is determined based on an average of the respective reputation score determined for each vehicle-based message of the plurality of vehicle-based messages.

Aspect 4: The method of any of Aspects 2 or 3, wherein the average includes a weighted average applying a respective weight to each vehicle-based message of the plurality of vehicle-based messages.

Aspect 5: The method of Aspect 2, wherein the reputation score for the transmitting device is determined based on a Markov-based additive increase-multiplicative decrease technique.

Aspect 6: The method of any of Aspects 1 to 5, wherein the information associated with the transmitting device includes at least one of a location of the transmitting device, a speed of the transmitting device, a heading of the transmitting device, or a motion of the transmitting device.

Aspect 7: The method of any of Aspects 1 to 6, wherein the reputation score for the transmitting device is determined based on comparing the information associated with the transmitting device with at least one of a predictor, a misbehavior detector, or a physical behavior of the transmitting device.

Aspect 8: The method of any of Aspects 1 to 7, wherein the receiving device is a central network entity and the transmitting device is one of a vehicle, a roadside unit (RSU), or user equipment (UE).

Aspect 9: The method of Aspect 8, wherein the central network entity is one of a multi-access edge computing (MEC) device or a base station.

Aspect 10: The method of any of Aspects 8 or 9, further comprising: determining, at the receiving device, a respective reputation score for each transmitting device of a plurality of transmitting devices.

Aspect 11: The method of Aspect 10, further comprising: transmitting each respective reputation score to each transmitting device of the plurality of transmitting devices.

Aspect 12: The method of any of Aspects 1 to 7, wherein the receiving device is one of a first vehicle, a first roadside unit (RSU), or a first user equipment (UE), and wherein the transmitting device is one of a second vehicle, a second RSU, or a second UE.

Aspect 13: The method of Aspect 12, wherein determining the reputation score for the transmitting device comprises: receiving, from a central network entity, at least one reputation score for the transmitting device; and determining, at the receiving device, the reputation score for the transmitting device based on the at least one reputation score for the transmitting device received from the central network entity.

Aspect 14: The method of any of Aspects 12 or 13, further comprising: receiving, from a central network entity, a reputation score for the receiving device.

Aspect 15: The method of any of Aspects 1 to 14, further comprising: determining, at the receiving device, a reputation score for the receiving device.

Aspect 16: An apparatus for wireless communications, comprising at least one memory and at least one processor (e.g., implemented in circuitry) coupled to the at least one memory. The at least one memory can be configured to store data, such as data included in one or more messages (e.g., an SDSM, a BSM, a CAM, a CPM, etc.). The at least one processor is configured to: receive a plurality of vehicle-based messages from a transmitting device, wherein each vehicle-based message of the plurality of vehicle-based messages comprises information associated with the transmitting device; and determine a reputation score for the transmitting device based on at least a portion of the information associated with the transmitting device from each vehicle-based message of the plurality of vehicle-based messages.

Aspect 17: The apparatus of Aspect 16, wherein, to determine the reputation score for the transmitting device, the at least one processor is configured to: determine a respective reputation score for each vehicle-based message of the plurality of vehicle-based messages based on at least the portion of the information associated with the transmitting device from each vehicle-based message of the plurality of vehicle-based messages; and determine the reputation score for the transmitting device based on the respective reputation score determined for each vehicle-based message of the plurality of vehicle-based messages.

Aspect 18: The apparatus of Aspect 17, wherein the at least one processor is configured to: determine the reputation score for the transmitting device based on an average of the respective reputation score determined for each vehicle-based message of the plurality of vehicle-based messages.

Aspect 19: The apparatus of Aspect 18, wherein the average includes a weighted average applying a respective weight to each vehicle-based message of the plurality of vehicle-based messages.

Aspect 20: The apparatus of Aspect 17, wherein the at least one processor is configured to: determine the reputation score for the transmitting device based on a Markov-based additive increase-multiplicative decrease technique.

Aspect 21: The apparatus of any of Aspects 16 to 20, wherein the information associated with the transmitting device includes at least one of a location of the transmitting device, a speed of the transmitting device, a heading of the transmitting device, or a motion of the transmitting device.

Aspect 22: The apparatus of any of Aspects 16 to 21, wherein the at least one processor is configured to: determine the reputation score for the transmitting device based on comparing the information associated with the transmitting device with at least one of a predictor, a misbehavior detector, or a physical behavior of the transmitting device.

Aspect 23: The apparatus of any of Aspects 16 to 22, wherein the apparatus is a central network entity and the transmitting device is one of a vehicle, a roadside unit (RSU), or user equipment (UE).

Aspect 24: The apparatus of Aspect 23, wherein the central network entity is one of a multi-access edge computing (MEC) device or a base station.

Aspect 25: The apparatus of any of Aspects 23 or 24, wherein the at least one processor is configured to: determine a respective reputation score for each transmitting device of a plurality of transmitting devices.

Aspect 26: The apparatus of Aspect 25, wherein the at least one processor is configured to: output each respective reputation score for transmission to each transmitting device of the plurality of transmitting devices.

Aspect 27: The apparatus of any of Aspects 16 to 22, wherein the apparatus is one of a first vehicle, a first roadside unit (RSU), or a first user equipment (UE), and wherein the transmitting device is one of a second vehicle, a second RSU, or a second UE.

Aspect 28: The apparatus of Aspect 27, wherein the at least one processor is configured to receive, from a central network entity, at least one reputation score for the transmitting device; and determine the reputation score for the transmitting device based on the at least one reputation score for the transmitting device received from the central network entity.

Aspect 29: The apparatus of any of Aspects 27 or 28, wherein the at least one processor is configured to: receive, from a central network entity, a reputation score for the apparatus.

Aspect 30: The apparatus of any of Aspects 16 to 29, wherein the at least one processor is configured to: determine a reputation score for the apparatus.

Aspect 31: The apparatus of any of Aspects 16 to 30, wherein the apparatus is configured as a vehicle, and further comprising: a transceiver configured to receive the plurality of vehicle-based messages.

Aspect 32: The apparatus of any of Aspects 16 to 30, wherein the apparatus is configured as a network entity, and further comprising: a transceiver configured to receive the plurality of vehicle-based messages.

Aspect 33: A non-transitory computer-readable medium of a network entity having stored thereon instructions that, when executed by one or more processors, cause the one or more processors to perform operations according to any of Aspects 1 to 32.

Aspect 34: An apparatus for wireless communications comprising one or more means for performing operations according to any of Aspects 1 to 32.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for wireless communications at a receiving device, the method comprising:
   receiving, at the receiving device, a plurality of vehicle-based messages from a transmitting device, wherein each vehicle-based message of the plurality of vehicle-based messages comprises information associated with the transmitting device;
   receiving, from a central network entity, at least one reputation score for the transmitting device; and
   determining, at the receiving device, a reputation score for the transmitting device based on a time-series combination of the information associated with the transmitting device from the plurality of vehicle-based messages received from the transmitting device and based on the at least one reputation score for the transmitting device received from the central network entity, the reputation score indicating at least one of an accuracy or validity of messages transmitted by the transmitting device.

2. The method of claim 1, wherein determining the reputation score for the transmitting device comprises:
   determining, at the receiving device, a plurality of reputation scores for the plurality of vehicle-based messages, the plurality of reputation scores comprising a respective reputation score for each vehicle-based message of the plurality of vehicle-based messages based on at least a portion of the information associated with the transmitting device from each vehicle-based message of the plurality of vehicle-based messages; and
   determining, at the receiving device, the reputation score for the transmitting device based on the plurality of reputation scores determined for the plurality of vehicle-based messages received from the transmitting device.

3. The method of claim 2, wherein determining the reputation score for the transmitting device based on the time-series combination comprises determining the reputation score for the transmitting device based on an average of the respective reputation score determined for each vehicle-based message of the plurality of vehicle-based messages.

4. The method of claim 3, wherein the average includes a weighted average applying a respective weight to each vehicle-based message of the plurality of vehicle-based messages.

5. The method of claim 2, wherein determining the reputation score for the transmitting device based on the time-series combination comprises determining the reputation score for the transmitting device based on a Markov-based additive increase-multiplicative decrease technique.

6. The method of claim 1, wherein the information associated with the transmitting device includes at least one of a location of the transmitting device, a speed of the transmitting device, a heading of the transmitting device, or a motion of the transmitting device.

7. The method of claim 1, wherein the reputation score for the transmitting device is determined based on comparing the information associated with the transmitting device with at least one of a predictor, a misbehavior detector, or a physical behavior of the transmitting device.

8. The method of claim 1, wherein the receiving device is a central network entity and the transmitting device is one of a vehicle, a roadside unit (RSU), or user equipment (UE).

9. The method of claim 8, wherein the central network entity is one of a multi-access edge computing (MEC) device or a base station.

10. The method of claim 8, further comprising:
determining, at the receiving device, a respective reputation score for each transmitting device of a plurality of transmitting devices.

11. The method of claim 10, further comprising:
transmitting each respective reputation score to each transmitting device of the plurality of transmitting devices.

12. The method of claim 1, wherein the receiving device is one of a first vehicle, a first roadside unit (RSU), or a first user equipment (UE), and wherein the transmitting device is one of a second vehicle, a second RSU, or a second UE.

13. The method of claim 12, wherein determining the reputation score for the transmitting device comprises:
receiving, from a central network entity, at least one reputation score for the transmitting device; and
determining, at the receiving device, the reputation score for the transmitting device based on the at least one reputation score for the transmitting device received from the central network entity.

14. The method of claim 12, further comprising:
receiving, from a central network entity, a reputation score for the receiving device.

15. The method of claim 1, further comprising:
determining, at the receiving device, a reputation score for the receiving device.

16. An apparatus for wireless communications, comprising:
at least one memory; and
at least one processor coupled to the at least one memory, the at least one processor configured to:
receive a plurality of vehicle-based messages from a transmitting device, wherein each vehicle-based message of the plurality of vehicle-based messages comprises information associated with the transmitting device;
receive, from a central network entity, at least one reputation score for the transmitting device; and
determine a reputation score for the transmitting device based on a time-series combination of the information associated with the transmitting device from the plurality of vehicle-based messages received from the transmitting device and based on the at least one reputation score for the transmitting device received from the central network entity, the reputation score indicating at least one of an accuracy or validity of messages transmitted by the transmitting device.

17. The apparatus of claim 16, wherein the at least one processor is configured to:
determine a plurality of reputation scores for the plurality of vehicle-based messages, the plurality of reputation scores comprising a respective reputation score for each vehicle-based message of the plurality of vehicle-based messages based on at least a portion of the information associated with the transmitting device from each vehicle-based message of the plurality of vehicle-based messages; and
determine the reputation score for the transmitting device based on the plurality of reputation scores determined for the plurality of vehicle-based messages received from the transmitting device.

18. The apparatus of claim 17, wherein, to determine the reputation score for the transmitting device based on the time-series combination, the at least one processor is configured to determine the reputation score for the transmitting device based on an average of the respective reputation score determined for each vehicle-based message of the plurality of vehicle-based messages.

19. The apparatus of claim 18, wherein the average includes a weighted average applying a respective weight to each vehicle-based message of the plurality of vehicle-based messages.

20. The apparatus of claim 17, wherein, to determine the reputation score for the transmitting device based on the time-series combination, the at least one processor is configured to determine the reputation score for the transmitting device based on a Markov-based additive increase-multiplicative decrease technique.

21. The apparatus of claim 16, wherein the information associated with the transmitting device includes at least one of a location of the transmitting device, a speed of the transmitting device, a heading of the transmitting device, or a motion of the transmitting device.

22. The apparatus of claim 16, wherein the at least one processor is configured to determine the reputation score for the transmitting device based on comparing the information associated with the transmitting device with at least one of a predictor, a misbehavior detector, or a physical behavior of the transmitting device.

23. The apparatus of claim 16, wherein the apparatus is a central network entity and the transmitting device is one of a vehicle, a roadside unit (RSU), or user equipment (UE).

24. The apparatus of claim 23, wherein the central network entity is one of a multi-access edge computing (MEC) device or a base station.

25. The apparatus of claim 23, wherein the at least one processor is configured to:
determine a respective reputation score for each transmitting device of a plurality of transmitting devices.

26. The apparatus of claim 25, wherein the at least one processor is configured to:
output each respective reputation score for transmission to each transmitting device of the plurality of transmitting devices.

27. The apparatus of claim 16, wherein the apparatus is one of a first vehicle, a first roadside unit (RSU), or a first user equipment (UE), and wherein the transmitting device is one of a second vehicle, a second RSU, or a second UE.

28. The apparatus of claim 27, wherein the at least one processor is configured to:
receive, from a central network entity, at least one reputation score for the transmitting device; and determine the reputation score for the transmitting device based on the at least one reputation score for the transmitting device received from the central network entity.

29. The apparatus of claim 27, wherein the at least one processor is configured to:
receive, from a central network entity, a reputation score for the apparatus.

30. The apparatus of claim 16, wherein the at least one processor is configured to: determine a reputation score for the apparatus.

* * * * *